(12) United States Patent
Capodice

(10) Patent No.: US 10,426,144 B2
(45) Date of Patent: Oct. 1, 2019

(54) TERRARIUM AND RELATED METHOD OF USE

(71) Applicant: Michael W. Capodice, Bloomington, IL (US)

(72) Inventor: Michael W. Capodice, Bloomington, IL (US)

( * ) Notice: Subject to any disclaimer, the term of this patent is extended or adjusted under 35 U.S.C. 154(b) by 306 days.

(21) Appl. No.: 15/425,626

(22) Filed: Feb. 6, 2017

(65) Prior Publication Data

US 2017/0251642 A1 Sep. 7, 2017

Related U.S. Application Data

(60) Provisional application No. 62/302,270, filed on Mar. 2, 2016.

(51) Int. Cl.
*A01G 9/02* (2018.01)
*A01K 63/00* (2017.01)
*A01G 9/16* (2006.01)

(52) U.S. Cl.
CPC .............. *A01K 63/006* (2013.01); *A01G 9/02* (2013.01); *A01G 9/16* (2013.01)

(58) Field of Classification Search
CPC ............. A01G 7/045; A01G 9/02; A01G 9/16
USPC ............................................................ 47/69
See application file for complete search history.

(56) References Cited

U.S. PATENT DOCUMENTS

| | | | |
|---|---|---|---|
| 2,732,199 A | 1/1956 | Meinig | |
| 3,108,401 A | 10/1963 | Richardson | |
| 3,479,990 A | 11/1969 | Crow | |
| 3,595,209 A | 7/1971 | Parker | |
| 4,358,908 A * | 11/1982 | Song | A01G 9/02 47/69 |
| 4,612,726 A * | 9/1986 | Mori | A01G 9/00 47/17 |
| 4,931,329 A * | 6/1990 | Sun | A01G 29/00 215/317 |
| 5,377,619 A | 1/1995 | Katz | |
| 5,511,512 A | 4/1996 | Pintavalli et al. | |
| 5,752,341 A | 5/1998 | Goldfarb | |
| 5,819,689 A | 10/1998 | Simon | |

(Continued)

FOREIGN PATENT DOCUMENTS

| | | |
|---|---|---|
| DE | 2544983 | 6/1976 |
| DE | 3524619 | 1/1987 |
| WO | 9639801 | 12/1996 |

*Primary Examiner* — David J Parsley
(74) *Attorney, Agent, or Firm* — Warner Norcross + Judd LLP

(57) ABSTRACT

A terrarium including a base, a support column, a top, and one or more arcuate panels with a closure is provided. The base can include one or more base channels, and the top can include one or more top channels. The top can be supported entirely by the support column at a first preselected distance from the base. One or more arcuate panels can extend between the top and the base, being disposed in the top channel and the base channel, and forming an opening. Another arcuate panel can form a closure over the opening, with that panel optionally slidable to selectively access an internal compartment of the terrarium. The support column can support the top and assist in holding the arcuate panels, as well as form a ventilation chimney associated with the internal compartment. Related methods of use are provided.

20 Claims, 22 Drawing Sheets

(56) References Cited

U.S. PATENT DOCUMENTS 7,143,544 B2 12/2006 Roy
2010/0146854 A1 6/2010 Cannon et al.

* cited by examiner

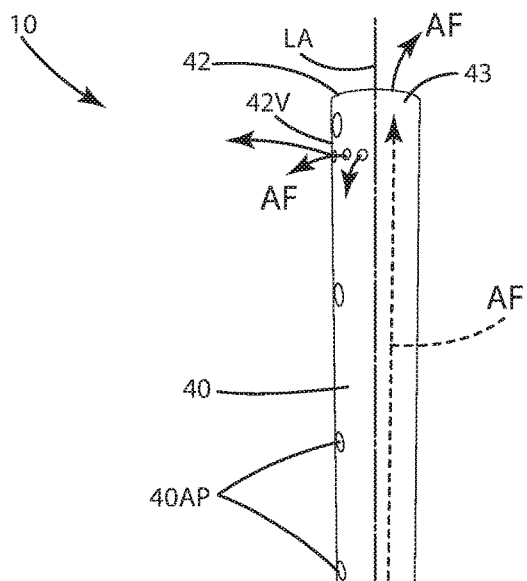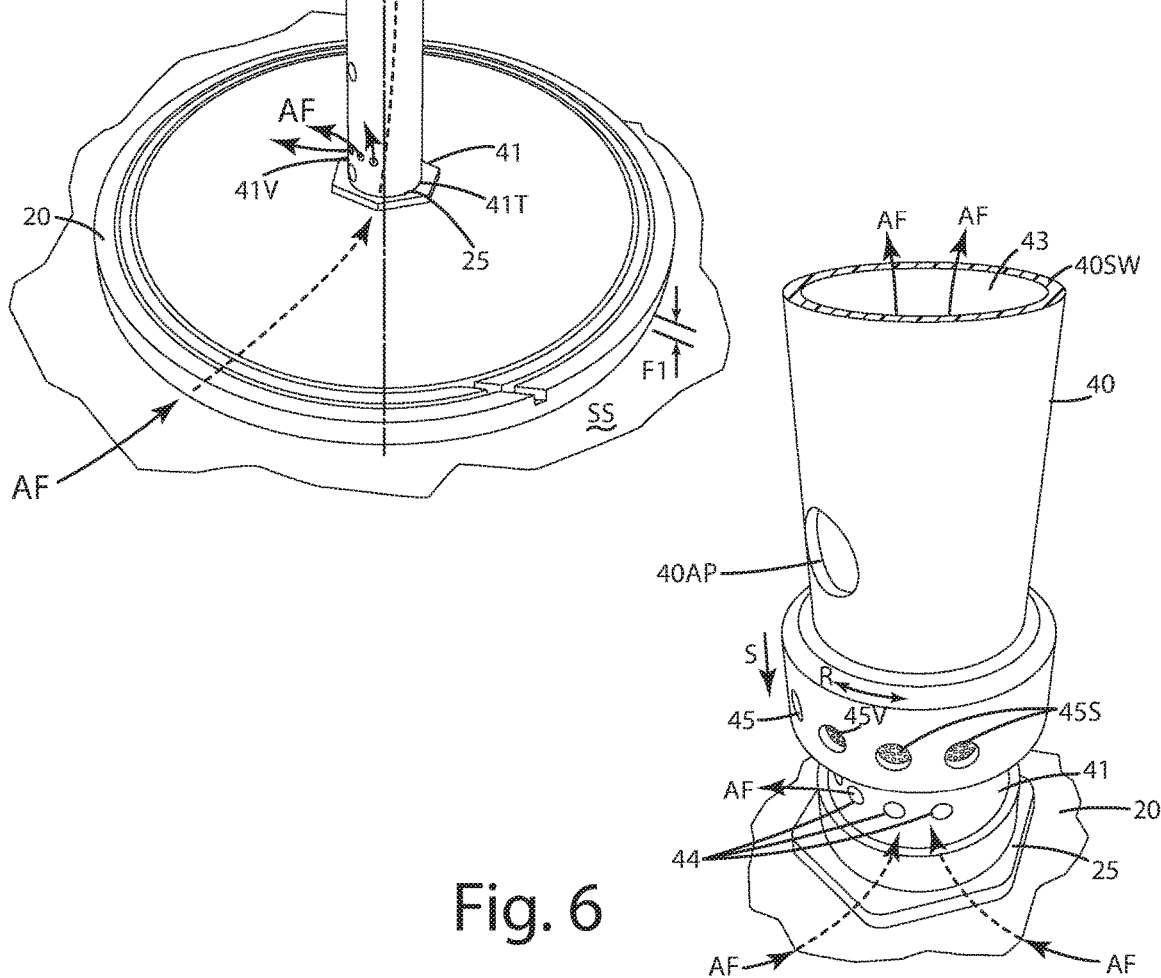
Fig. 5
Fig. 6

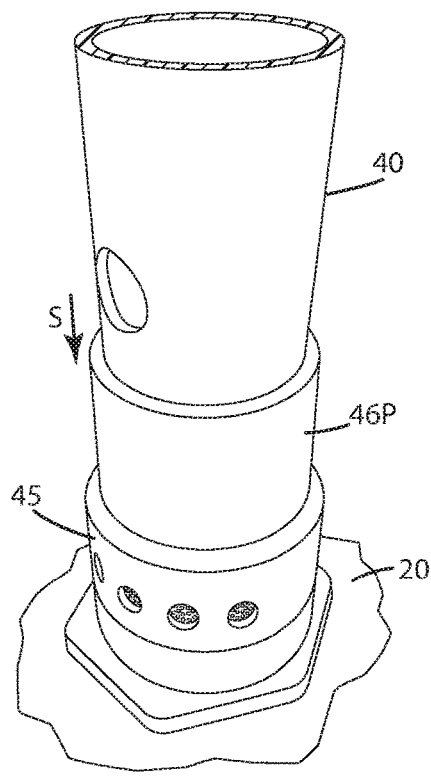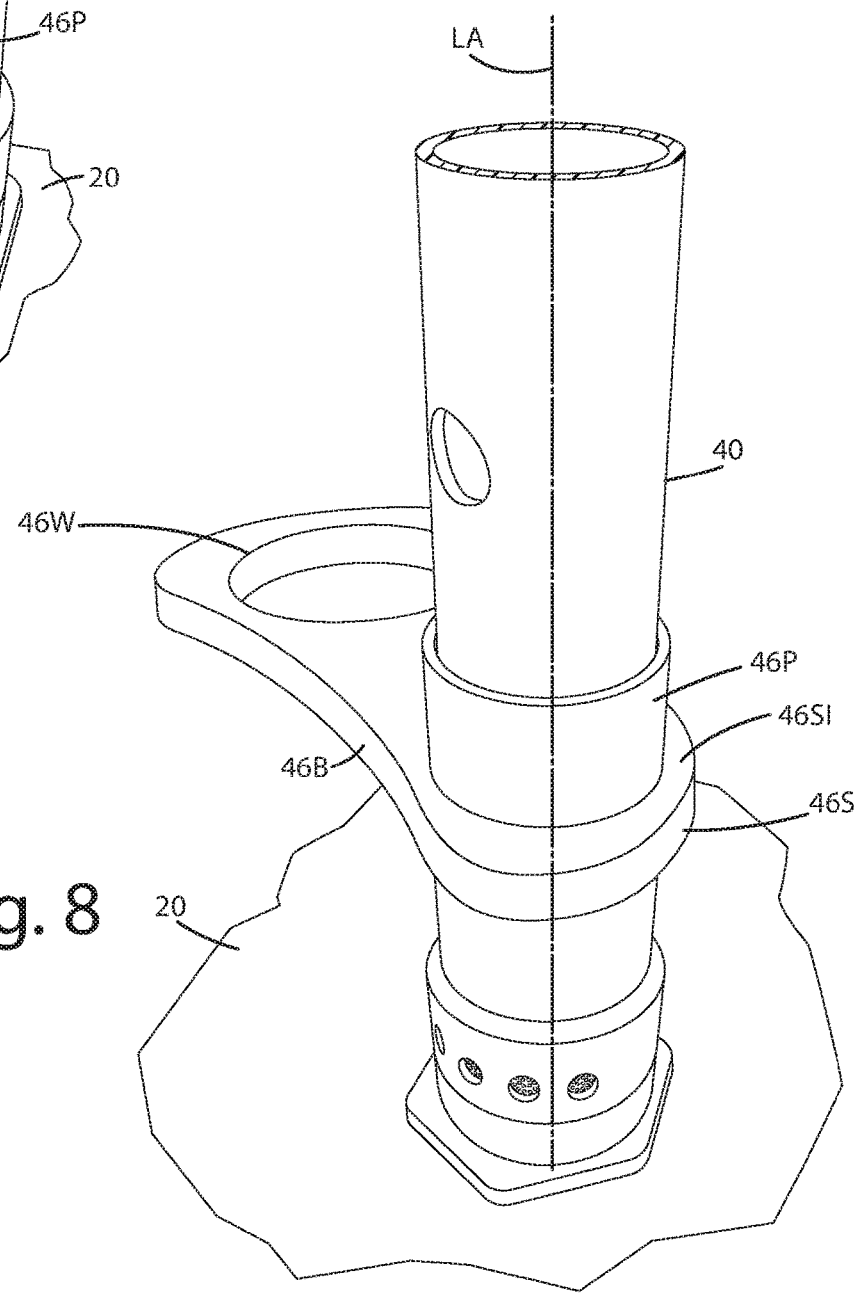

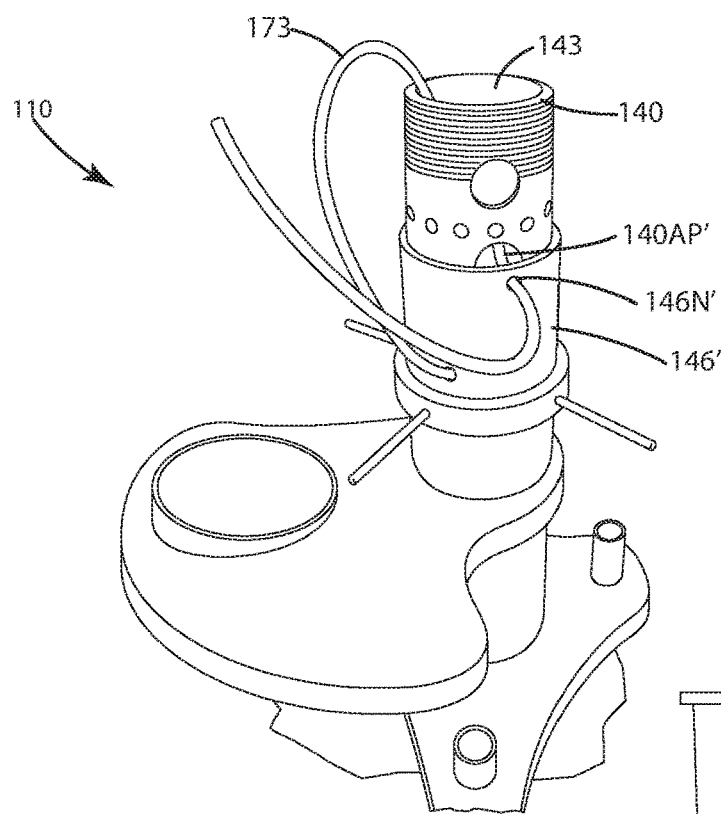
Fig. 28
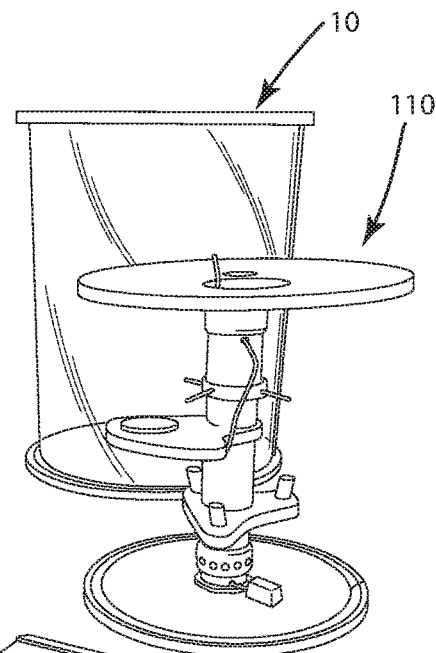
Fig. 29
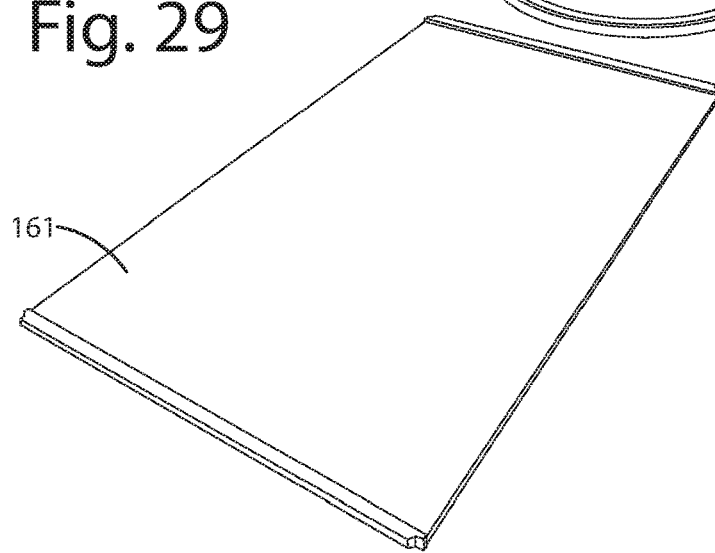

TERRARIUM AND RELATED METHOD OF USE

BACKGROUND OF THE INVENTION

The present invention relates to enclosures, and more particularly to a terrarium for housing plants and/or animals, and a related method of use.

There are a variety of terrariums used to house and keep animals, such as reptiles, amphibians and fish, as well as other animals, and plants. Conventional terrariums are constructed to include transparent glass so that users can observe the animals or plants from outside the terrarium. Many terrariums are constructed in the form of a box or rectangular shape for simplicity. For example, some are formed from four glass walls arranged perpendicular to one another to form a box shape. The walls are fastened to a bottom and a rectangular cover rests atop the walls to prevent the animals from escaping. The cover typically is fully supported by the walls, and is removable to access the interior of the terrarium for routine maintenance and cleaning. This can be helpful, but in many cases, access to the interior from the top of the terrarium can be limited, particularly for tall-walled terrariums. Reaching to the bottom of the terrarium, where most animal waste is disposed, can also be burdensome, requiring awkward user orientation and/or special tools.

Many terrariums are used to house animals that require certain humidity, ventilation and thermal conditions. While some manufacturers try to address these requirements, adding special fans and/or humidifiers, they usually fall short due to the size and shape of conventional enclosures. Frequently, the add-ons also increase electricity consumption, and thus the cost of maintaining the terrarium.

Manufacturers typically ship terrariums in their final form. Where the terrariums are large, the shipping can be expensive, and the packaging for the same can be overly bulky and unwieldy.

Conventional terrariums also can be outfitted with a variety of accessories, depending on the animals, plants and their native habitat. For example, some terrariums can have lights disposed in the cover. To power these lights, an electrical cord extends from the cover and down a side wall of the terrarium. Frequently, the electrical cord is left unconcealed, which can be unsightly and can present safety issues. As another example, a water dish can be placed on the floor of the terrarium for the animals to drink and use. While this can be helpful, some animals, such as snakes, prefer elevated positions in the terrarium, and are less likely to visit the water on the bottom. As yet another example, artificial foliage or trees can be placed inside the terrarium for animals to use. These items, however, can be unwieldy and difficult to secure, particularly where they are self-supporting or leaned into the corners of the walls.

Accordingly, there remains room for improvement in the field of terrariums to provide easier access to the interior, less clutter for accessories, better ventilation, easy shipping, and efficient use of space.

SUMMARY OF THE INVENTION

A terrarium including a base, a support column, a top, and one or more arcuate panels with a closure is provided.

In one embodiment, the base can include one or more base channels, and the top can include one or more top channels. The top can be supported entirely by the support column at a first preselected distance from the base.

In another embodiment, the arcuate panels can extend between the top and the base, and can be disposed in the top channel and the base channel. A first panel can include first and second side edges, separated from one another optionally forming an opening between the top and the base.

In still another embodiment, a second arcuate panel can be disposed in another top channel and another base channel. This second arcuate panel can form a closure over the opening. The second arcuate panel can be slidably disposed in the other top and base channels to enable it to be slid over and away from the opening to expose an internal compartment of the terrarium.

In even another embodiment, the at least one of the first and second arcuate panels is a transparent panel so that a user can view inside the terrarium to thereby observe plants and animals therein.

In yet another embodiment, the support column can define an interior bore, extending from an upper end to a lower end, effectively forming a chimney or ventilation conduit for the internal compartment. The bottom of the chimney can be open to an underside of the base to permit airflow under the base and into the chimney.

In a further embodiment, the support column can include first air vents in the lower end and second air vents in the upper end. These vents can be selectively opened and closed to modulate ventilation and air flow through the chimney and thus the internal compartment.

In still a further embodiment, the interior bore can house an electrical cord and/or a conduit which extends upward within the interior bore toward the top. The top can include a light that projects radiation into the internal compartment, and the electrical cord can be joined with the light to power it. The electrical cord optionally can be joined with a heater or some other electrical device disposed in the internal compartment. The conduit can be joined with a watering bucket, which can intermittently drip water into the internal compartment.

In yet a further embodiment, a support ring can be joined with the column. The support ring can be configured to support various accessories within the terrarium. For example, the support ring can be joined with a watering receptacle, a platform and/or a perch. The support ring engages the column and supports the accessory at a preselected distance from the base, usually depending on the type of animal housed in the terrarium. A user can adjust the location of the support ring relative to the column and thereby adjust the preselected distance to fine tune it for a particular animal.

In even a further embodiment, one or more spacers can be used to engage and support the support rings. The spacers also can selectively space the support rings vertically along the support column so that air vents and opening in the column are easily accessible.

In still a further embodiment, a method of using the terrarium is provided. The method can include placing a base including a first base channel, on a support surface; joining a support column with the base, the support column defining an interior bore that forms a chimney adapted to convey air from adjacent the base upward; joining a top with the support column, the top including a first top channel, the top being supported entirely by the support column at a first preselected distance from the base; moving a first flat, planar sheet in the first base channel and in the first top channel so as to bend the first, flat planar sheet into a first arcuate panel; forming an opening between first and second ends of the first arcuate panel; and forming a closure over the opening with a second arcuate panel.

The current embodiments of the terrarium and related methods of provide benefits in the field that previously have been unachievable. For example, where the support column supports entirely the top, no additional structure is needed to support the top. Thus, the arcuate panels can be slidable and movable relative to the top without altering the integrity of the terrarium. Where the support column forms a chimney, that component provides ventilation that was not previously available. Where the chimney is associated with selectively modifiable air vents, a user can precisely modulate ventilation and heat in the internal compartment. Where the modular support rings and accessories are included, a user can custom build their own terrarium based on their personal preferences or those of the animals housed therein. In cases where the support column includes an interior bore, unsightly electrical cords and other conduits can be selectively concealed therein. In addition, where the arcuate panels are initially provided as flat planar sheets, those sheets, as well as the other components of the terrarium can be shipped in a relatively flat, manageable configuration and in associated packaging.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 5 is a perspective view of a support column installed relative to the base;

FIG. 6 is a perspective view of a lower ventilation unit being installed on the support column FIG. 7 is a perspective view of a spacer being installed on the support column;

FIG. 8 is a perspective view of support ring joined with a platform being installed on the support column;

FIG. 28 is a perspective view thereof with a conduit being disposed in the support column and projecting out therefrom;

FIG. 29 is a perspective view of the first alternative embodiment of the terrarium with a flat planar sheet of material about to be installed therein;

DESCRIPTION OF THE CURRENT EMBODIMENTS

Figure 1:
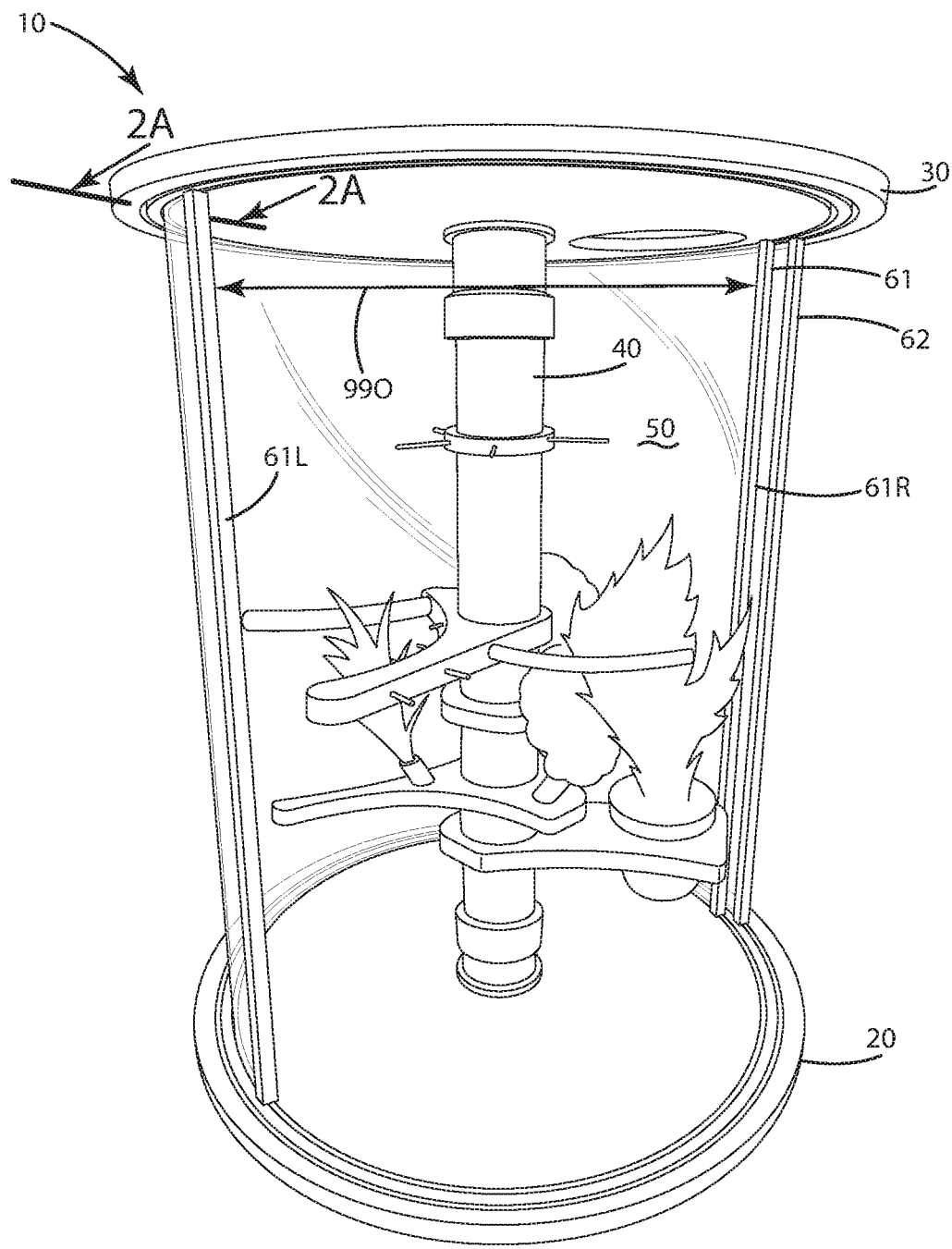
FIG. 1 is a perspective view of a terrarium of a current embodiment in an open mode.

A current embodiment of the terrarium is illustrated in FIGS. 1-21, and generally designated 10. The terrarium can include a base 20, a top 30 and a support column 40. The support column can be configured to define an interior bore 43 that extends from a first or lower end 41 to a second or upper and 42. The interior bore 43 can form a chimney within the confines of the terrarium. This chimney can provide ventilation and can circulate air within the internal compartment 50 of the terrarium via a system of one or more vents, for example lower and upper vents 41V and 42V. The support column 40 also can be constructed so that it substantially entirely supports the top 30 relative to the base 20, holding the top a first preselected distance D1 therefrom. The support column can support optionally 95%-100% of the weight of the top 30, while the one or more arcuate panels 61 and 62 optionally can support 5%-0% of the weight of the top 30.

The arcuate panels themselves can be constructed initially as flat, planar sheets of material. When the flat sheets are initially slid into respective channels of the top and the base, the sheets bend and conform to an arcuate shape, thereby forming the arcuate panels 61 and 62. The arcuate panels can be configured so that the first arcuate panel 61, after installation, remains substantially stationary relative to its channel, as well as the top and the base. This first arcuate panel also can form an opening 99O between its left and right side edges 61L and 61R, as shown in FIG. 1. The second arcuate panel 62 can form a closure over this opening as shown in FIGS. 2 and 22-24. Optionally, the second arcuate panel 62 can slide relative to the top and base, generally parallel to the first panel, to open and close the opening 900.

As used herein, a terrarium can refer to a vivarium for animals and/or plants, optionally including at least one transparent panel so the same can be viewed by a user. The terrarium herein can be used with any type of amphibian or reptile, such as lizards, frogs, snakes, alligators, salamanders, newts and the like. The terrarium also can be used with aquatic animals, such as various types of fish and the like. The terrarium can be used with land dwelling or tree dwelling animals, and can be utilized with virtually any type of plant and/or foliage, alone or used to form habitat for animals housed in the terrarium.

Further, as used herein, an arcuate panel can refer to any panel or sheet that is formed to include at least one rounded portion. For example, a panel can be pre-formed and/or partially bent to form a partial cylindrical shape, a partial elliptical shape, a partial oval shape, a parabolic shape and the like when the panel is viewed from an upper or lower edge thereof. The at least one rounded portion can be joined with other more linear or curvilinear portions, depending on the application.

The individual components and construction of the terrarium 10 will now be described in further detail. Referring to FIGS. 1 and 3-5, the terrarium 10 includes a base 20 and a top 30. The base 20 includes an outer periphery 20O. This outer periphery 20O as illustrated can be in the form of a circle. Of course other shapes, such as polygons, trapezoids and other shapes can be used to form the outer perimeter. The base 20 includes an upper surface 20U and a lower surface 20L. The upper surface 20U generally faces upward, toward the internal compartment 50. The lower surface 20L generally faces downward toward a support surface SS upon which the terrarium is placed. The lower surface 20L can include one or more feet 20F. These feet can place the base 20 and in particular the lower surface 20L a preselected distance F1 from the support surface SS. Accordingly, airflow AF can move toward the opening 25 of the base 20, which can be directly associated with an in fluid communication with the chimney and/or interior bore 43 of the support column 40.

The base 20 can define a base opening 25 in a central location relative to the outer periphery 20O. Where the outer periphery 20O is circular in shape, the opening 25 can be disposed directly in the geometric center of the outer periphery 20O. Of course, in other constructions, there can be more than one opening 25 that is defined in the base for more than one support columns, and these openings can be displaced from the geometric center of the outer periphery 20O. Optionally, more than one support column can be utilized in the terrarium 10 and spaced according to the support function thereof. Further optionally, all the support columns can be spaced inward from any outer walls or arcuate panels a reselected distance, in some cases, so that the support columns do not engage or contact those walls or panels.

The opening 25 itself can include a threaded interior 25T. This threaded interior 25T can mesh with corresponding threads on the lower end 41 of the support column 40. In this manner, the support column 40 can be threaded into, and fastened or secured fixedly to the base 20. Optionally, the opening can be absent, and the support column can be integrally formed with the base. In other constructions, the support column can be fastened and/or secured to the base using clamps or the like. Further optionally, the support column can be joined fixedly with the top and/or the base using other connections. For example, the column can be adhered, welded, melted to, molded to, integrally formed with, pinned, locked or otherwise connected to the top and the base.

The base 20 can include a first base channel 21 and a second base channel 22. Each of these base channels can respectively guide the first arcuate panel 61 and the second arcuate panel 62. The first base channel 21 can be disposed inwardly from the second base channel 22, and optionally located a distance farther away from the outer periphery 20O. As illustrated, the channels can be of a circular configuration but of course, if other panel shapes are desired, that shape can be modified to an oval, elliptical, partial parabolic or some other arcuate shape as described herein.

Optionally, the first and second channels 21 and 22 can be U-shaped grooves defined in the upper surface 20U of the base 20. In other cases, these channels can be U-shaped frames that extend upward from the upper surface 20U. In some cases, a separate U-shaped channel hoop can be joined with the base 20 to provide the channel. In other cases, the respective channels can be of an L-shape, with the lower portion of the L secured to the upper surface 20U of the basin 20. A variety of other channel configurations can be provided to guide the respective arcuate panels 61 and 62, and to open and close the terrarium.

Figure 3:
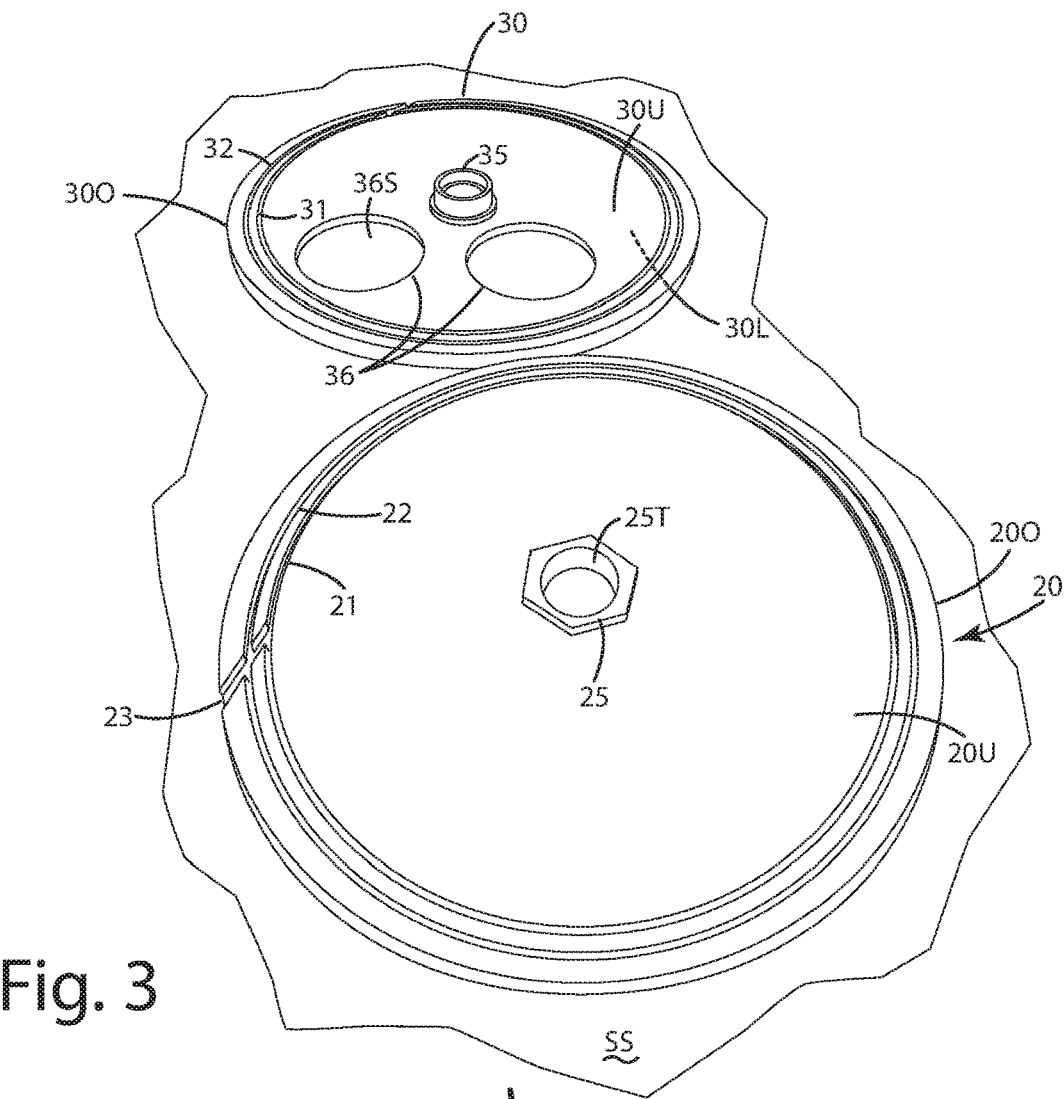
FIG. 3 is a top view of a base and a top of the terrarium.
Figure 4:
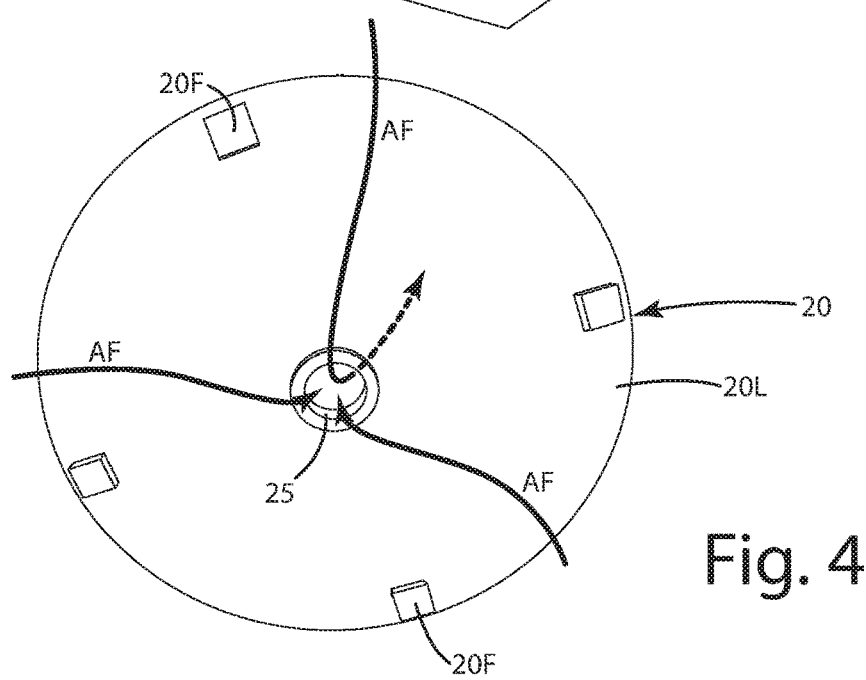
FIG. 4 is a bottom view of the base.

Optionally, as shown in FIG. 3, one or more of the first and second channels can be aligned with and in communication with an introducer channel 23. This introducer channel can extend inward from the outer periphery 20O to each of the respective channels. In this manner, a sheet of material, for example a flat, planar sheet can be slid through the introducer channel 23 and selectively introduced into either the respective first and second base channels 21 and 22 as further described below. Further optionally, the top 30 can include a similar introducer channel.

Figure 12:
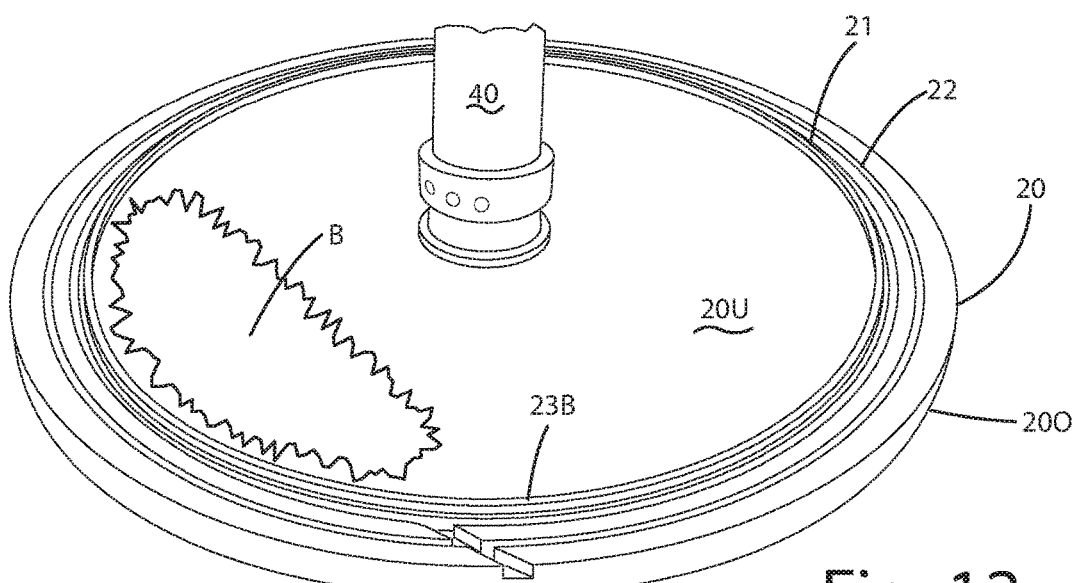
FIG. 12 is a perspective view of a bedding barrier placed adjacent channels of the base.

Further optionally, as shown in FIG. 12, the base 20 can include a barrier wall 23B. This barrier wall can be used to form a barrier between the upper surface 20U, upon which bedding B is placed, and the base channels 21, 22. This barrier wall 23B can prevent the bedding B from entering the base channels 21 and 22, which in turn can prevent that bedding from impairing movement of the arcuate panels within those channels. The barrier wall can be of a variety of heights, for example optionally 2 inches, further optionally 1 inch, even further optionally ½ inch or smaller, or larger, depending on the bedding, location of the channels and activity of the animals in the bedding B. Alternatively, the barrier wall can be deleted from the construction and the upper surface 20U can include a recess defined in the base 20 so that the bedding is disposed below the first and second channels 21 and 22. Other constructions are contemplated for maintaining the bedding out of the channels.

With reference to FIG. 3, the top 30 can be of a similar shape in configuration as the base 20. The top 30 can include an outer periphery 30O that is similar and/or identical to the periphery of the base 20O. The top 30 also can define first and second top channels 31 and 32. These channels can be constructed similar to the base channels 21 and 22, and when the support column is joined with both the top and the base, the top channels 31 and 32 can be generally parallel with the first and second base channels 21 and 22, with each generally equidistant from the center or longitudinal axis LA of the terrarium. Of course, where other shapes are used for the base and top, these channels can vary in distance from that longitudinal axis LA.

Figure 2:
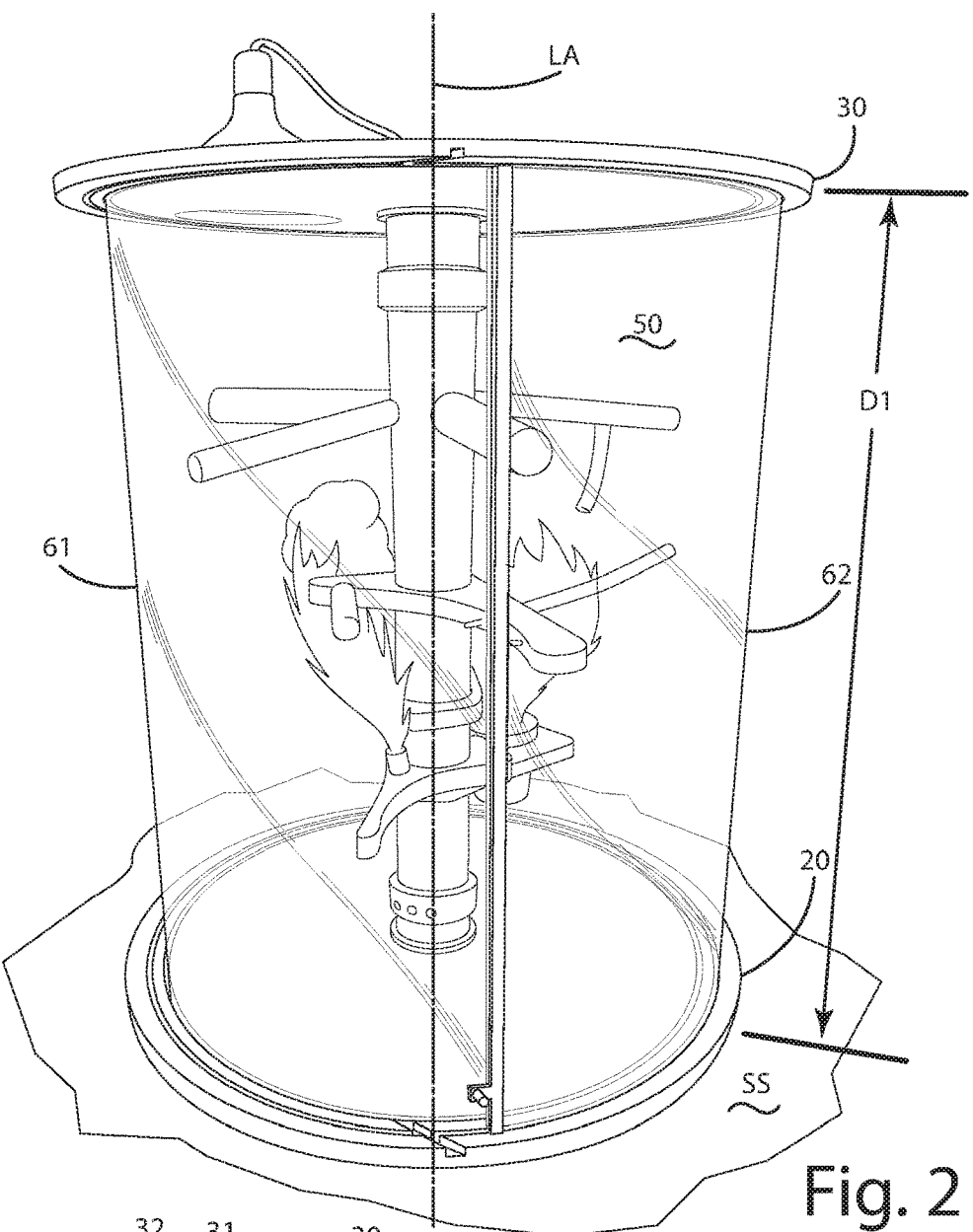
FIG. 2 is a perspective view of the terrarium in a closed mode.
Figure 2A:
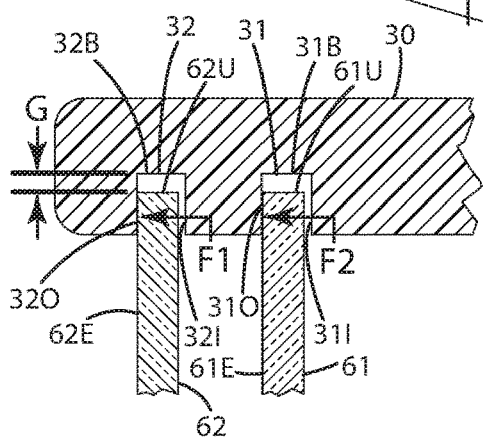
FIG. 2A is a section view of a top and panels of the terrarium taken along line 2A-2A in FIG. 2.

As shown in FIG. 2A, the panels 61 and 62 fir within the first and second top channels 31 and 32 so that a gap G is established between the upper edge 62U of the second panel 62 and the base or bottom 32B of the second channel 32. This gap can be approximately optionally ⅓₂ inches to ¾ inches, further optionally 1/16 inches to ¼ inches, or other distances depending on the application and the configuration of the channels and panels. A similar gap G likewise can be established between the upper surface 61U of the first panel 61 and the bottom 31B of the first top channel 31. Optionally, this gap G can exist between the panels and the channels, or more generally a space can exist between the panels and the top, because the support column 40 supports virtually all of the weight of the top 30. Thus, the panels 61 and 62 may not support any of the weight of the top 30. In this manner, the upper edges of these panels are simply disposed in the respective channels, without bearing much if any weight of the top 30.

As further illustrated in FIG. 2A, each of the first 61 and second 62 arcuate panels, when installed fully in the respective top channels (as well as the base channels, although not shown) can exert an outward force F1, F2 against the outside walls 32O and 31O of the respective top channels 32 and 31. These forces can be generated if the panels 61 and 62 initially are installed in the terrarium as flat, planar sheets of polymeric material. Optionally, the forces and engagement by the arcuate panels can be substantially only on the outside walls 32O and 31O of the channels, but not the inside walls 32I and 31I of the channels. In some cases, the panels in the channels may only engage the outer walls, but not the inner wells of the channels. As the sheets are bent upon insertion into the channels, as described further below, the effect is that the panels, when in the channels, exert the forces F1 and F2 against the outer walls of the respective channels. This effect is due to the panels trying to regain the former flat, planar sheet configuration. Indeed, the panels are urged outward, toward the outer boundaries of the channels, due to the flat, planar sheet memory of the panels. If the outer walls were not present, radially outward from the longitudinal axis LA relative to each of the respective first and second channels, then the arcuate panels 61 and 62 might spring outward, trying to re-attain the flat, planar sheet configuration.

Figure 11:
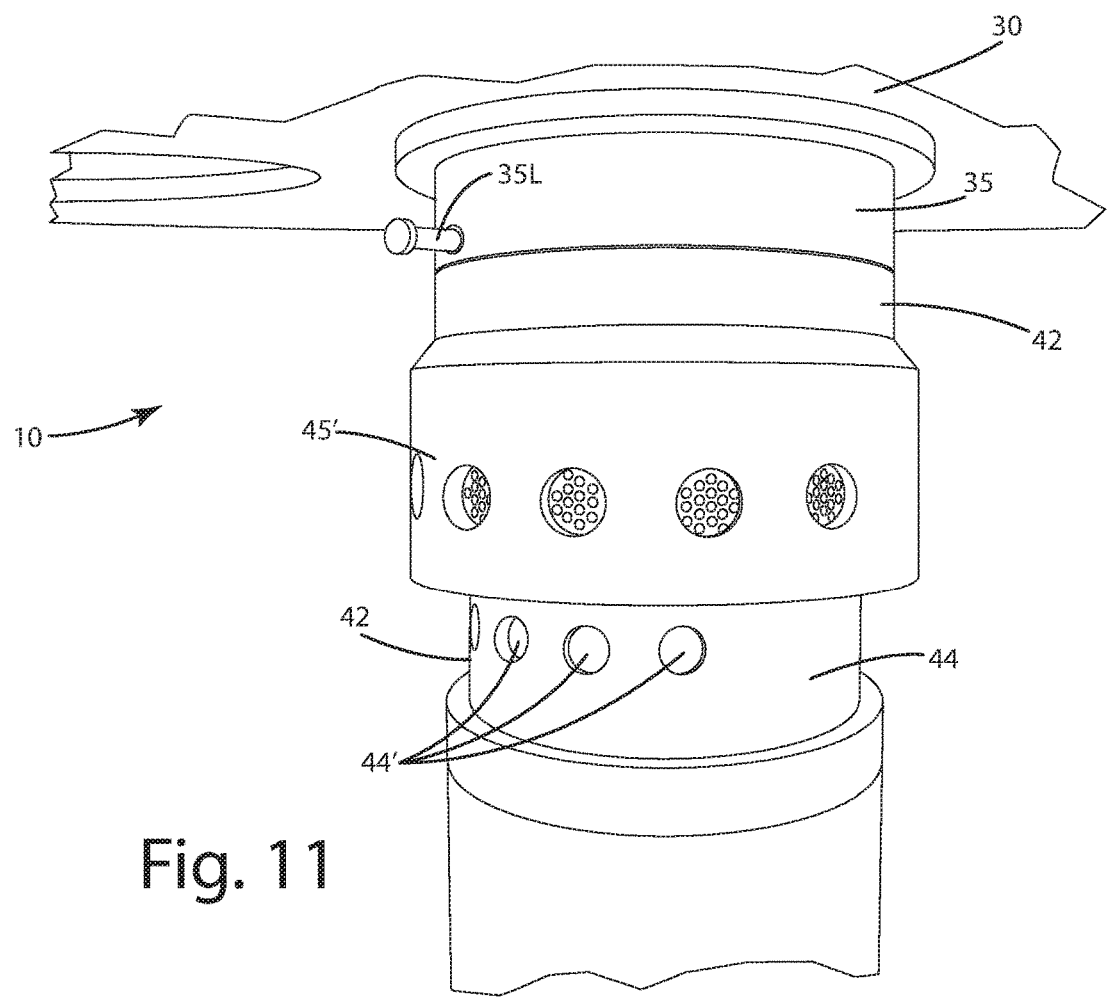
FIG. 11 is a perspective view of a locking mechanism that prevents the top from rotating relative to the support column.

The top also can include a connector 35 that is configured to join with the upper end 42 of the support column 40. As shown in FIGS. 3 and 5, the upper and of the support column can be threaded. The connector element 35 also can be correspondingly threaded. In this manner, the top 30 can be threaded onto and fixedly joined with the support column 40. If desired, as shown in FIG. 11, the support column and connector 35 can be joined via a locking pin 35L that extends through corresponding holes in the connector 35 and the upper end of the support column 40. This can prevent the top from rotating when the arcuate panels are installed relative to the top, sliding within the top channels 31 and 32.

Optionally, where the terrarium is set up to include one or more lighting and/or heater systems, the top can define one or more additional openings 36. These openings 36 can extend completely through the top, for example, from the upper surface 30U to the lower surface 30L of the top 30. These openings 36 also can be outfitted with a cover screen 30 6S, which can be designed to ensure that the animals within the terrarium do not engage the light and/or heating element, which could potentially cause injury.

The base and top can be constructed from a variety of materials. For example these components can be constructed from plastic, wood, composites, metal and the like. The components can be formed via injection molding, 3-D printing, pour molding, casting, machining and other similar techniques.

As shown in FIG. 5, the terrarium 10 also includes the support column 40, which is secured to the base 30 and projects upwardly therefrom. The support column can be in the form of cylindrical, hollow tube constructed from a relatively high-strength material so that it can support the weight of the top 30. As mentioned above, the support column can define an interior bore 43. The support column can include uniform sidewall 40SW that extends around the interior bore as shown in FIG. 6. Although not shown, in some cases, the support column can be a solid structure, without an interior bore 43.

The support column can be tubular, defining the interior bore 43 from the lower and 41 all the way to the upper end 42 so that air can freely flow through that interior bore. In some cases, the support column can be constructed from a polymeric pipe and/or a steel pipe or metal pipe.

As shown in FIGS. 5 and 6, the support column can be outfitted to include multiple access ports 40AP. These access ports can be sized to extend an optional electrical cord there through to power a electrical device at a predetermined location along the support column, and thus a preselected distance away from the base 20. Of course, the support column can be used to introduce water, gases or other items into the internal compartment depending on the application.

As shown in FIG. 6-7, the support column 40 can define first or lower air vents 44 adjacent the lower end 41. These air vents can be configured to draw in or expel air from or into the support column. In this manner, airflow can move through the interior bore 43, optionally improving ventilation and air circulation within the internal compartment 50. The air vents 44 can be opened and closed by use a first ventilation unit 45 which can be slid in direction S over the support column 40 and into communication with the first air vents 44. Optionally, the first ventilation unit 45 can include corresponding vents 45 of the can be selectively aligned or misaligned with the first air vents 44, thereby opening and closing those vents 44. In this manner, a user can modulate airflow into the chimney/support column, and thus the respective ventilation in the internal compartment 50. The first ventilation unit 45 can be rotatable in direction R to selectively aligned and misalign the vents 45V with the first vents 44, thereby altering airflow through both. If desired, the ventilation unit 45 can be outfitted with ventilation screens 45S disposed in the vents 45V to prevent animals from escaping from the internal compartment 50 through the vents 44.

Figure 9:
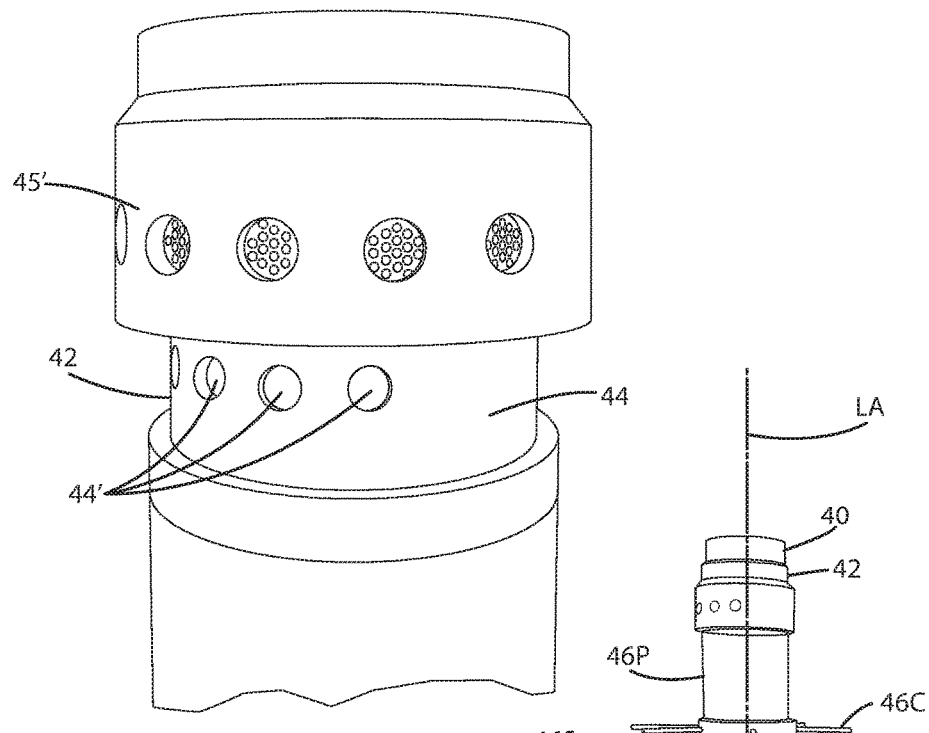
FIG. 9 is a perspective view of an upper ventilation unit being installed on the support column.
Figure 13:
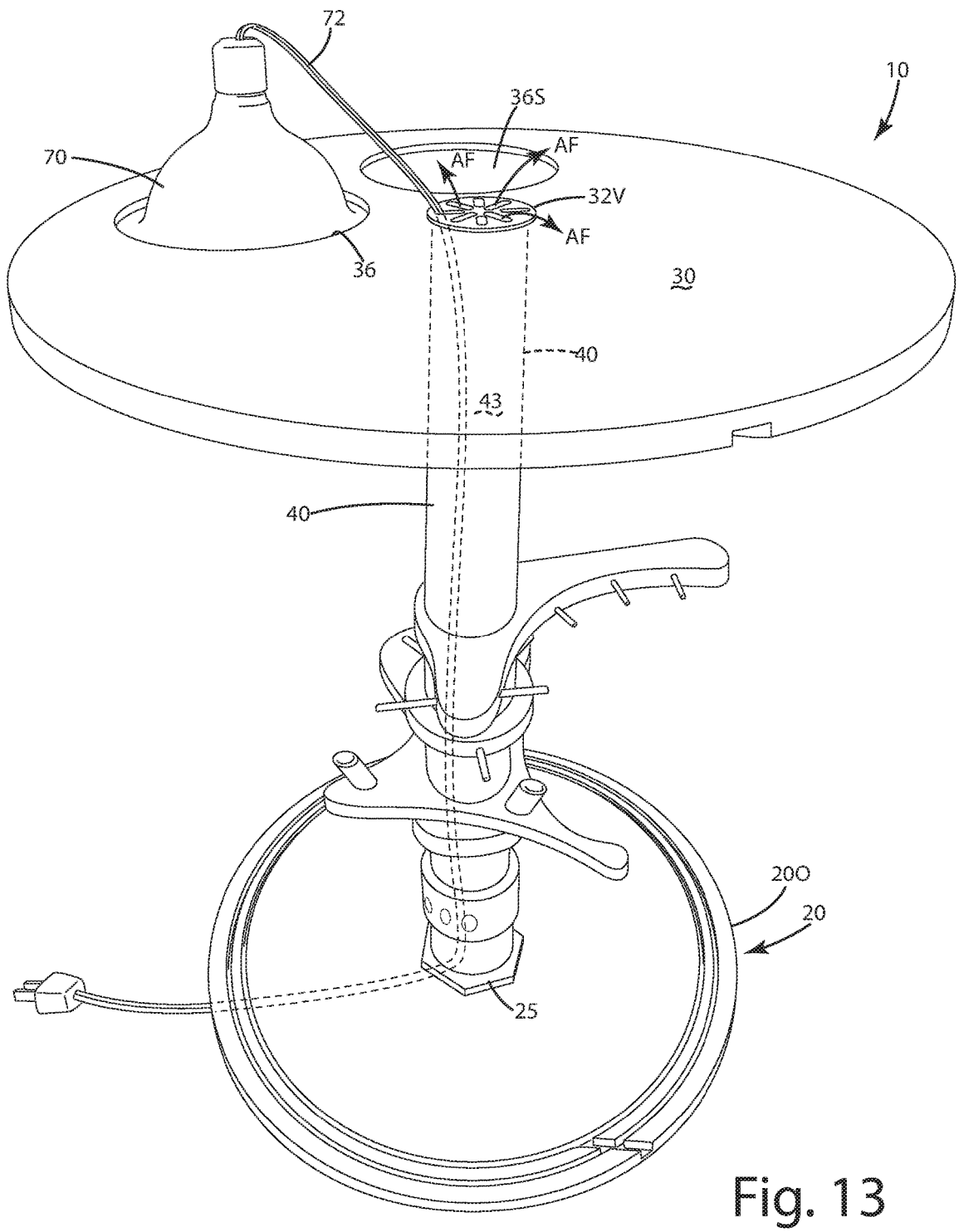
FIG. 13 is a top perspective view of the top including a light.

As shown in FIGS. 9 and 11, the support column 40 can further define a second air vents 44' adjacent the upper and 42 of the support column 40. These air vents can be selectively opened and closed via the second ventilation unit 45' which is configured similar to the first ventilation unit 45, and operates in a manner similar to that described above in connection with that unit 45. Further optionally, the first and second air vents 44, 44', and associated ventilation units 45, 45', can cooperate to provide selective fluid communication within the support column and the internal compartment 50. As an example, the air vents 44 in the lower and can operate as a cold air return to expel cold air from the bottom of the internal compartment 50. The upper vents 44' can be used to expel warm air from the chimney into the internal compartment 50, or alternatively these air vents in the upper end 42 can be used to vent excess heat within the internal compartment out through the vents 44', into the support column. As will be evident, the upper and lower vents can function in a manner so that the support column, and in particular the interior bore 43 acts as a chimney. As shown in FIG. 6, airflow can go into the lower vents 44. As shown in FIG. 11, airflow can travel through the chimney and out the vents near the upper end 42 of the support column. As shown in FIG. 13, airflow can optionally flow out through the top vent 32V defined by the top 30 of the terrarium 10.

Figure 10:
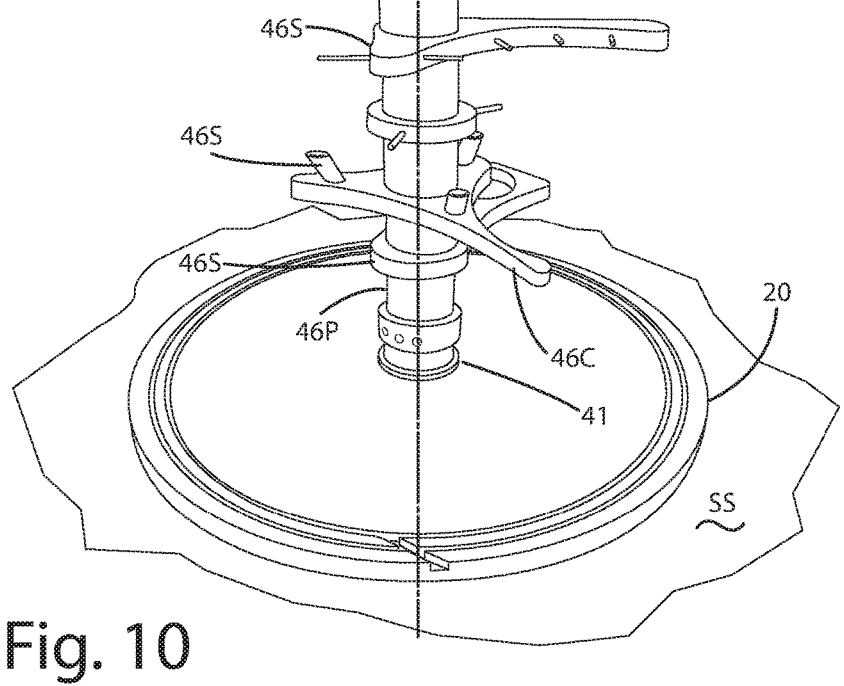
FIG. 10 is a perspective view of the support column being occupied by different support rings, accessories and ventilation units.

Referring to FIGS. 7-10, the support column can be configured to accommodate a variety of spacers 46P and support rings 46S. The spacers 46P can be used to selectively space the support rings 46S from the base 20. The spacers optionally can be of a preselected height to ensure that the support rings 46S do not obstruct access ports 40AP. The spacers can generally be of a tubular construction having an inner diameter that is larger than the outer diameter of the support column so that the spacers, as shown in FIG. 7, can be slid downward in direction S, to stack upon an engage the next lower component in the support column. The support rings 46S can include in and interior diameter 46S1 that also is slightly larger than the exterior outer diameter of the support column 40 so that the support rings can be slid down onto the support column. Optionally, the lower surface of the support ring 46S can engage an upper surface or other portion of the spacer to further support the support ring. The support rings 46S can be configured to support an accessory, such as a platform 46B a water receptacle 46W, a perch 46C or other devices for the general entertainment, feeding and/or support of animals disposed and the housed in the internal compartment 50. These respective accessories can extend radially outward from the longitudinal axis LA of the support column and/or terrarium. As shown in FIG. 10, multiple spacers 46P and multiple support rings 46S can be selectively disposed and supported by support column 40.

Although not shown, the support column 40 can be outfitted with a variety of additional ports and/or holes that extend between the interior bore and the internal compartment 50 of the terrarium. The support column can include heater elements, radiation units, lighting units, watering units or other devices housed in or at least partially extending through these ports to provide heat, radiation, light and/or water into the internal compartment 50.

Figure 14:
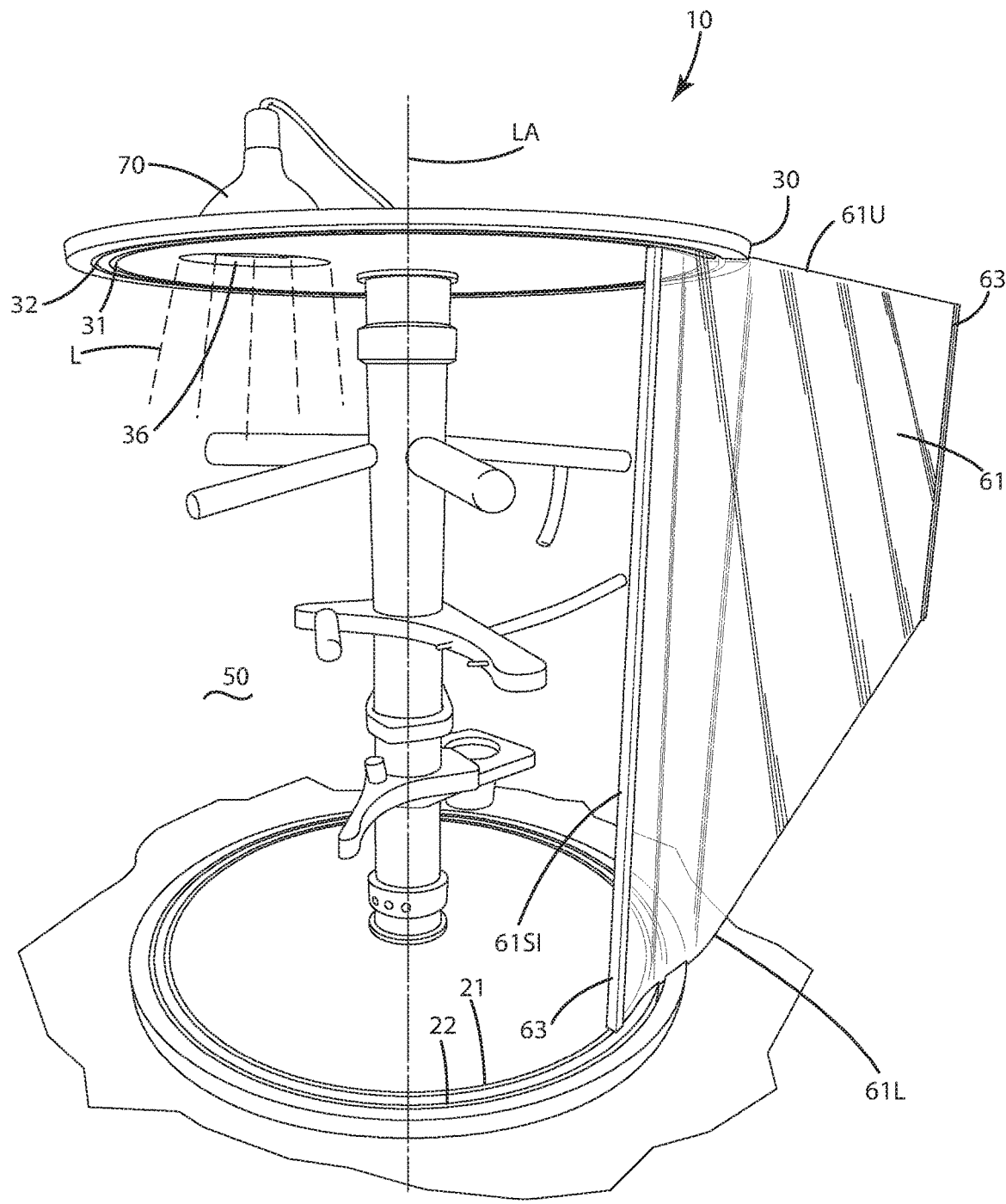
FIG. 14 is a perspective view of a flat, planar sheet of polymeric material before installation relative to the top and base.

As shown in FIG. 13, the support column 40, and in particular the interior bore 43 within the support column 40, can be used to house electrical cords, conduits or other items. If desired, the terrarium can be outfitted with a light unit 70, which optionally can be disposed in one of the openings 36 of the top 30. In this manner, as shown in FIG. 14, the light 70 can emit light L downward into the internal compartment 50. Of course, the light unit 70 can be replaced with a heater, a fan, or some other electrical device which can alter the environment within the internal compartment 50 to benefit of animals and/or plants housed therein. As shown in FIG. 13, the light is joined with the electrical cord 72 which extends downwardly into the interior bore 43 the support column 40. The cord can extend out from the opening 25 in the base 20 and outward beyond the outer periphery 20O of the basin 20. From there, the cord can be plugged into a power source.

Figure 26:
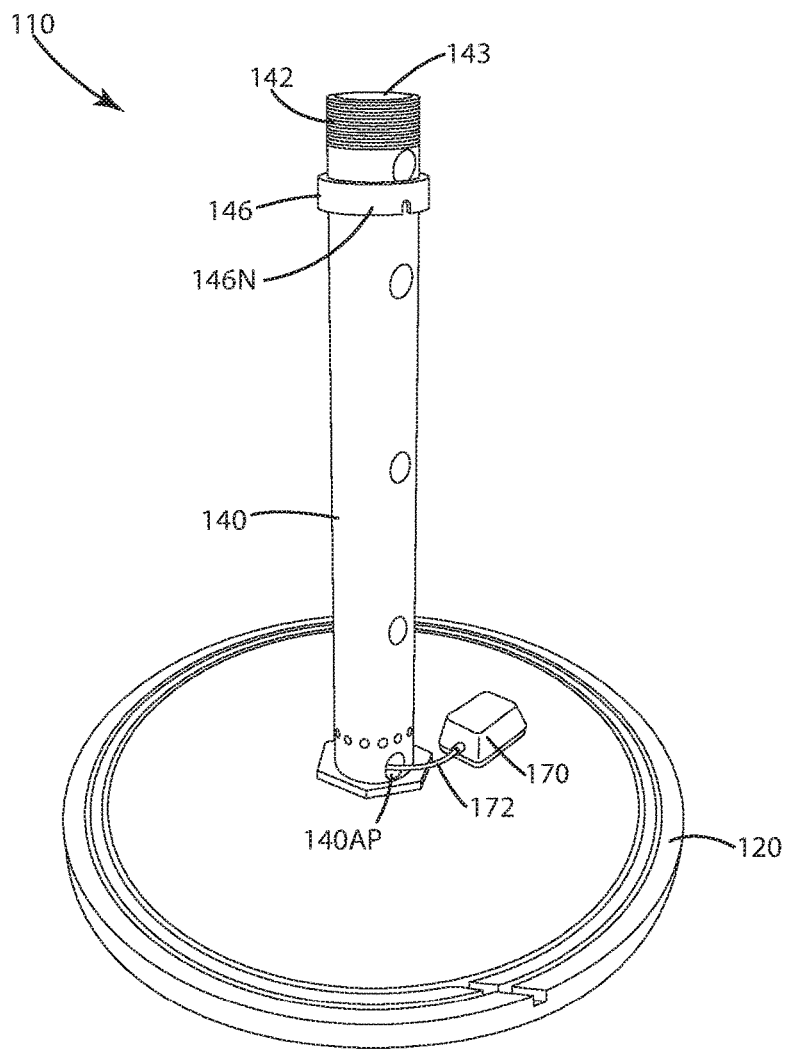
FIG. 26 is a perspective view of a first alternative embodiment of the terrarium within electrical device being installed through the support column.
Figure 27:
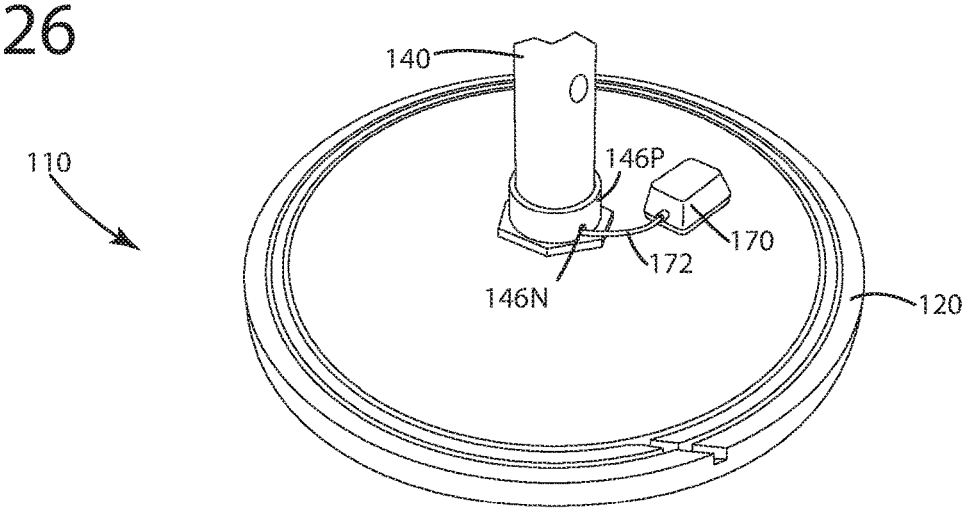
FIG. 27 is a perspective view of thereof, with a concealer spacer disposed adjacent an electrical cord of the device.

In an alternative embodiment of the terrarium 110 shown in FIG. 26-28, the support column 140 and in particular its interior bore 143 can house cords for electrical devices in locations below the upper end 142 of the column. For example as shown in FIG. 26, the support column can define a lower access port 140AP. A user can extend and electrical cord 172 through that lower access port 140AP. The electrical cord can extend into the interior bore 143 of the support column. The electrical cord 172 can be joined with an electrical water pump 170. In this manner, the cord of the water pump can be concealed within the support column and not overly visible. The cord also can be captured within a notch 146 and of a special spacer 146P that is slid over the exterior of the support column. This can further conceal the access port 140AP so that animals cannot escape through it and into the support column.

In the alternative embodiment of the terrarium 110, shown in FIG. 28, the interior bore 143 of the support column 140 also can be used to conceal at least a portion of a conduit 173. This conduit can be a watering tube for a drip feeder to slowly drip water into the internal compartment of the finished terrarium. The conduit can extend through a portion of the interior bore 143 of the support column 140. The conduit also can extend through an upper access port 140AP', and further through a notch 146N' defined by yet another spacer 146'. In this construction, the access port 140 AP' can also be covered to prevent animals from escaping there through.

Figure 30:
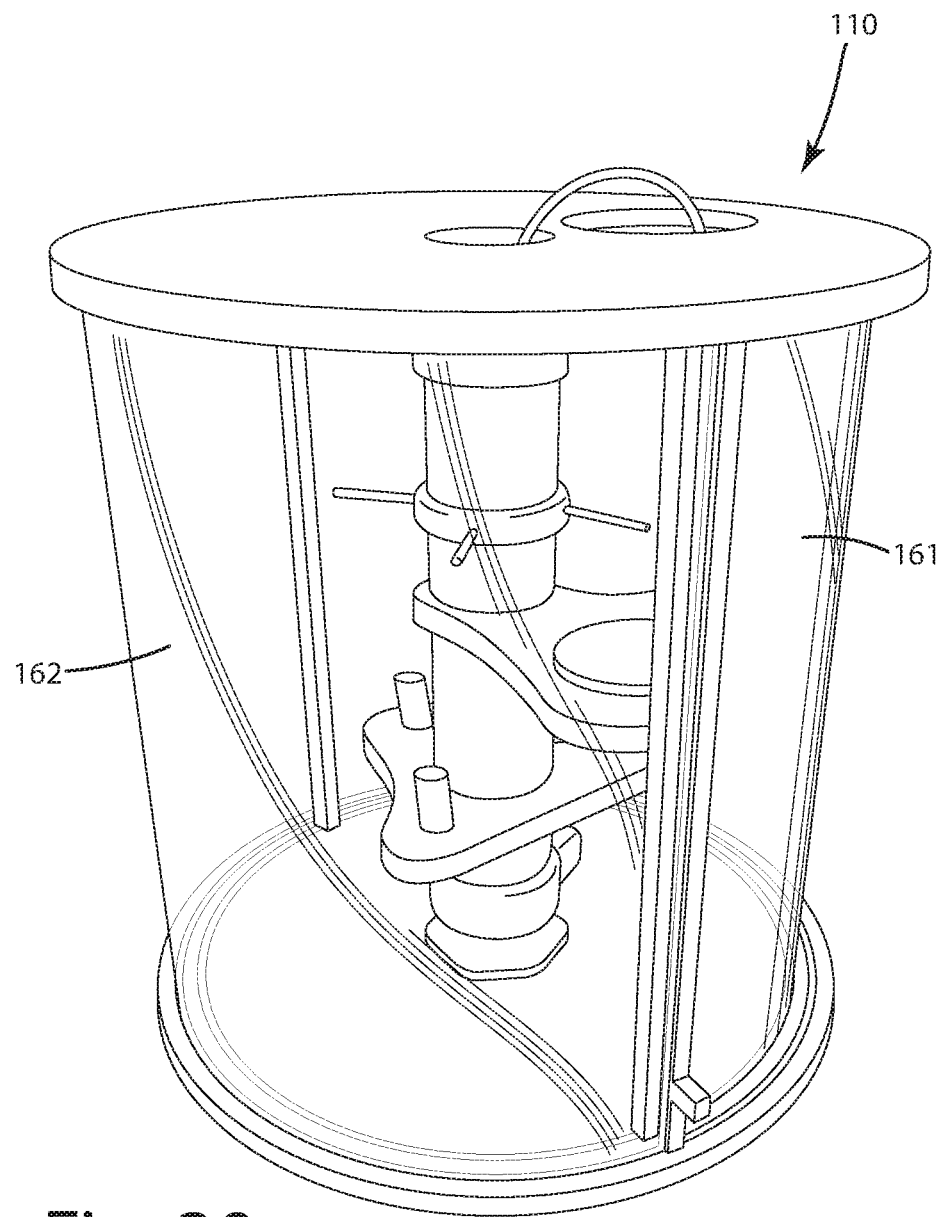
FIG. 30 is a perspective view of the first alternative embodiment of the terrarium, with all arcuate panels installed, and fully forming an internal compartment therein.

Returning to the embodiment of the terrarium 10 shown in FIGS. 14-25, that construction can include one or more arcuate panels 61 and 62. These arcuate panels 61 and 62 can be constructed from a variety of materials, depending on the application and the desired properties of the panels. As illustrated, the panels 61 and 62 can be constructed from a transparent, polymeric material such as Plexi-Glass™, Lexan™ or other materials, such as composite materials and/or metal materials, optionally with adequate openings to make the panel appear to be transparent or semi-transparent, or other materials optionally capable of being transparent or translucent, and in some cases flexible when in a sheet form. The panels 61 and 62 alternatively can be constructed from a translucent material and/or an opaque material. For example, as shown in the alternative embodiment in FIGS. 29-30, the first panel 161 is constructed from a metal sheet, which optionally can be previously constructed in a flat planar configuration. The metal sheet may include a plurality of apertures and/or perforations, so that the sheet acts like a screen to provide air flow through the internal compartment of the terrarium. Of course, other sheets, such as plastic sheets, opaque or otherwise non-transmissive can be used in its place. Further optionally, when the perforated sheets and panels are used, the vents and ventilation units might be eliminated from the construction, depending on the application.

Figure 18:
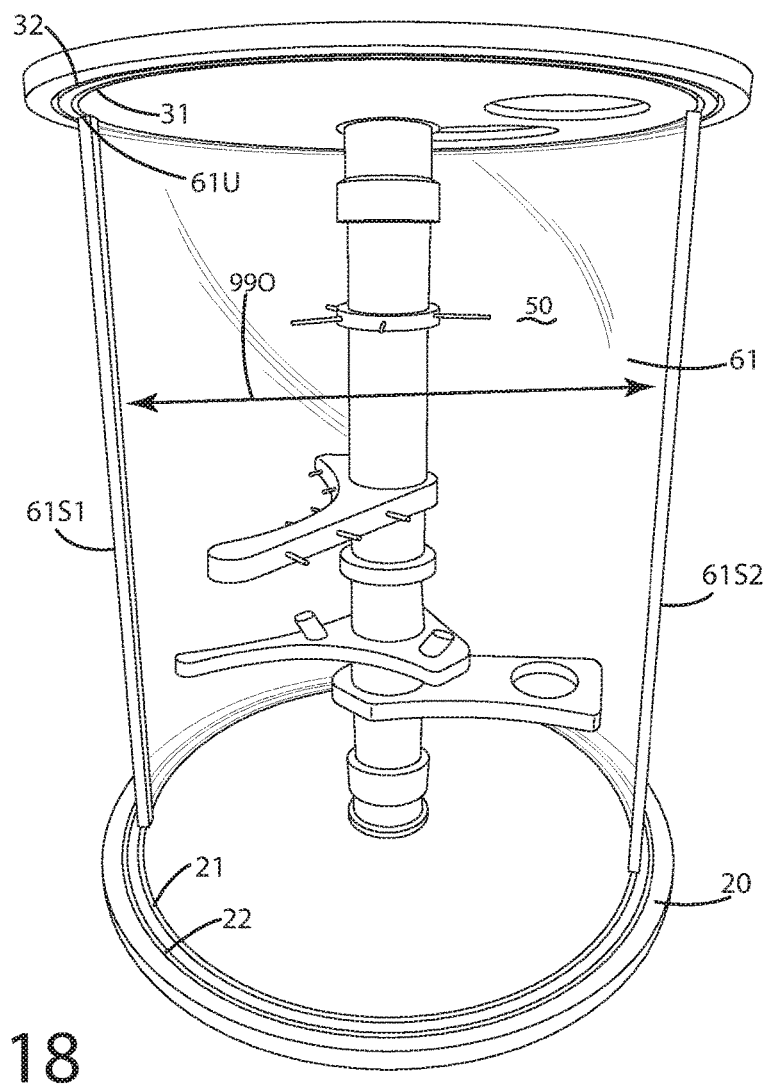
FIG. 18 is a perspective view of the terrarium with the first arcuate panel fully installed therein.
Figure 19:
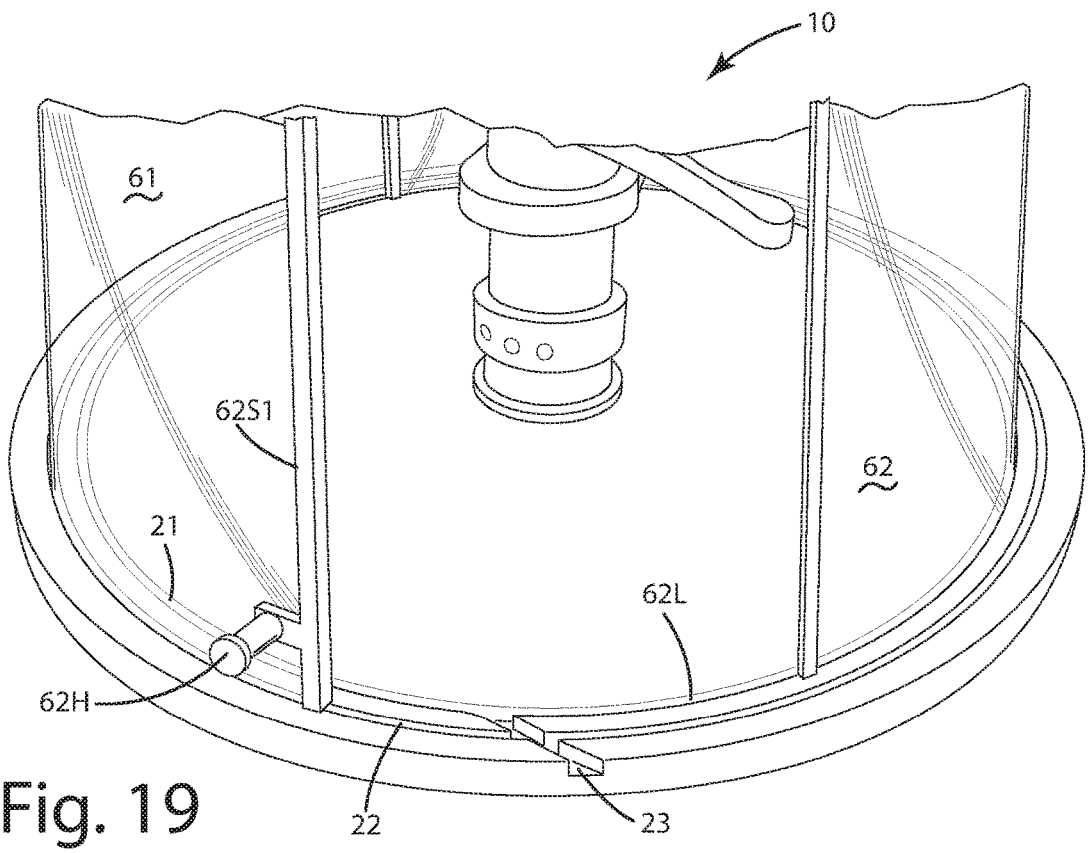
FIG. 19 is a perspective view of a second arcuate panel being installed in another base channel, and being introduced thereto through the introducer channel.
Figure 20:
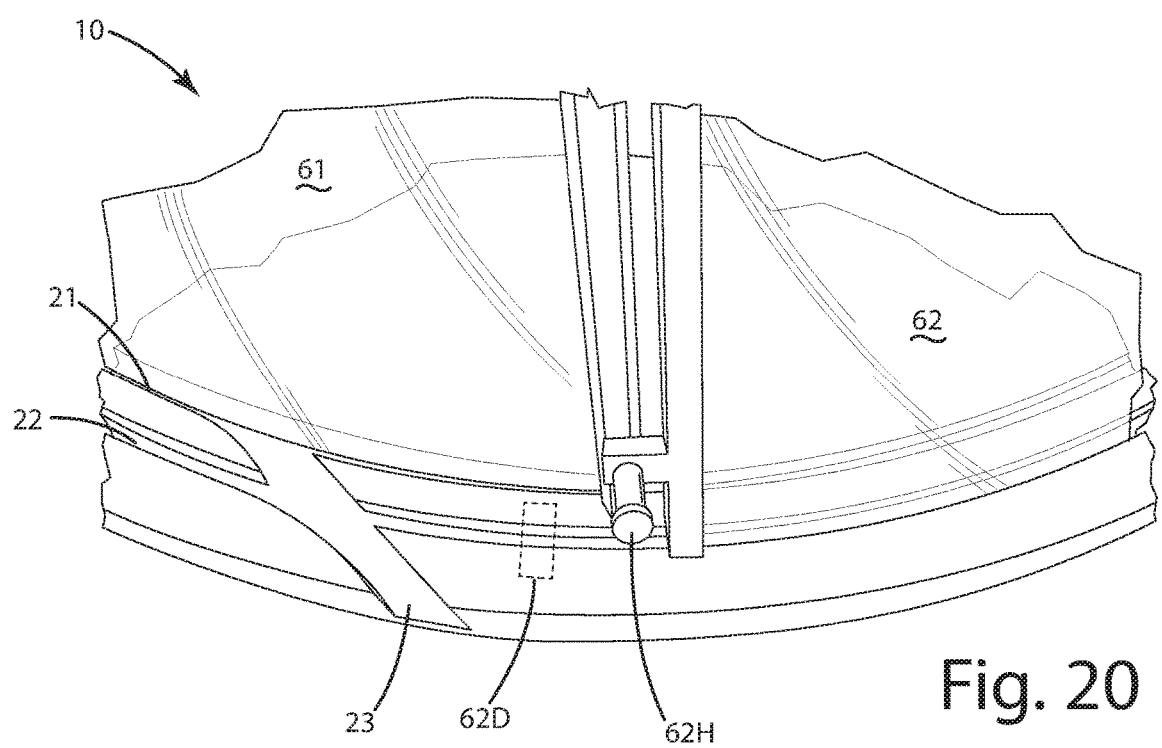
FIG. 20 is a perspective view of the second arcuate panel closing a closure formed by the first arcuate panel.
Figure 21:
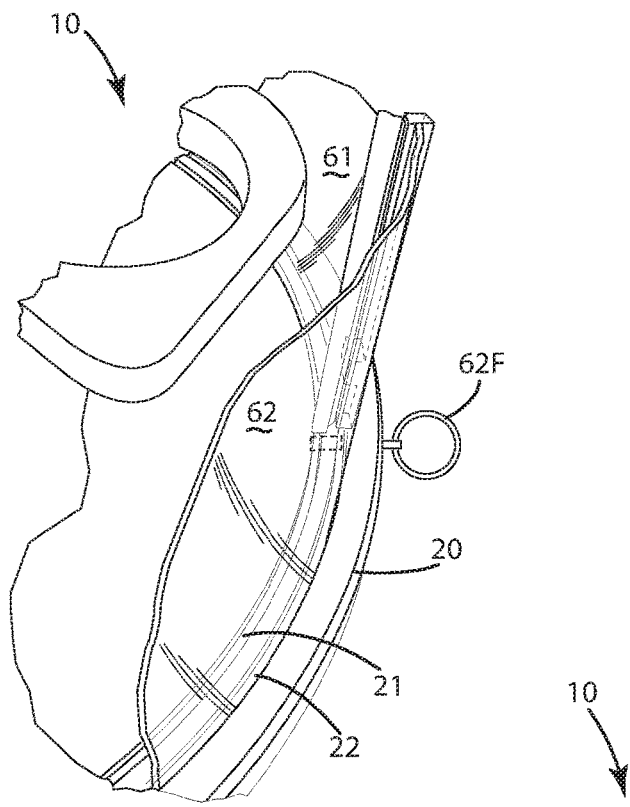
FIG. 21 is a perspective view of a panel lock that prevents the second arcuate panel from being opened relative to the opening.

As shown in FIGS. 14 and 18, the first panel 61 can include an upper edge 61U and a lower edge 61L distal from one another. Generally the upper edge 61U is configured to slide within the first top channel 31 and the first base channel 21 when installed in the terrarium. The top edge 61U and the lower edge 61L can be generally parallel with one another. The panel 61 also can include a first side edge 61S1 and a second side edge 61S2 disposed on an opposite side of the panel 61. These edges can be generally parallel with one another. Optionally, each of the edges can be housed or otherwise concealed within a channel or flange 63. This channel or flange can optionally be of a U-shape, and can protect the respective side edges of the panel to prevent cracking, chipping or damage to the same. These channels also can be outfitted with projections and/or handles (not shown) to assist in moving the panel 61 through the respective channels 21 and 31.

As shown in FIG. 14, the first panel 61 can be initially provided in the form of a flat, planar sheet of material. When the flat planar sheet is inserted into and moved through the respective top and bottom channels, it attains and arcuate configuration as shown for example in FIGS. 15-18. This arcuate configuration can be dictated via the configuration of the top and base channels as further described below.

As shown in FIG. 18, after the panel 61 is fully installed in the respective top and base channels 31 and 21, it is of an arcuate shape. The upper edge 61U of the panel is disposed in the top channel 31, as shown in FIG. 2A, and described above. The lower edge is disposed in the base channel 21. The first side edge 61S1 and second side edge 61S2 are separated from one another by a distance to effectively form an opening 99O between these edges. This opening provides access to the internal compartment 50 of the completed terrarium 10. This opening can extend optionally at least 10%, further optionally at least 20%, even further optionally at least 30%, yet further optionally, yet further optionally at least 40%, and even further optionally at least 50%, around the circumference or outside dimension of the base 20. The precise size of the opening can be dictated by desired access to the internal compartment 50.

Figure 16:
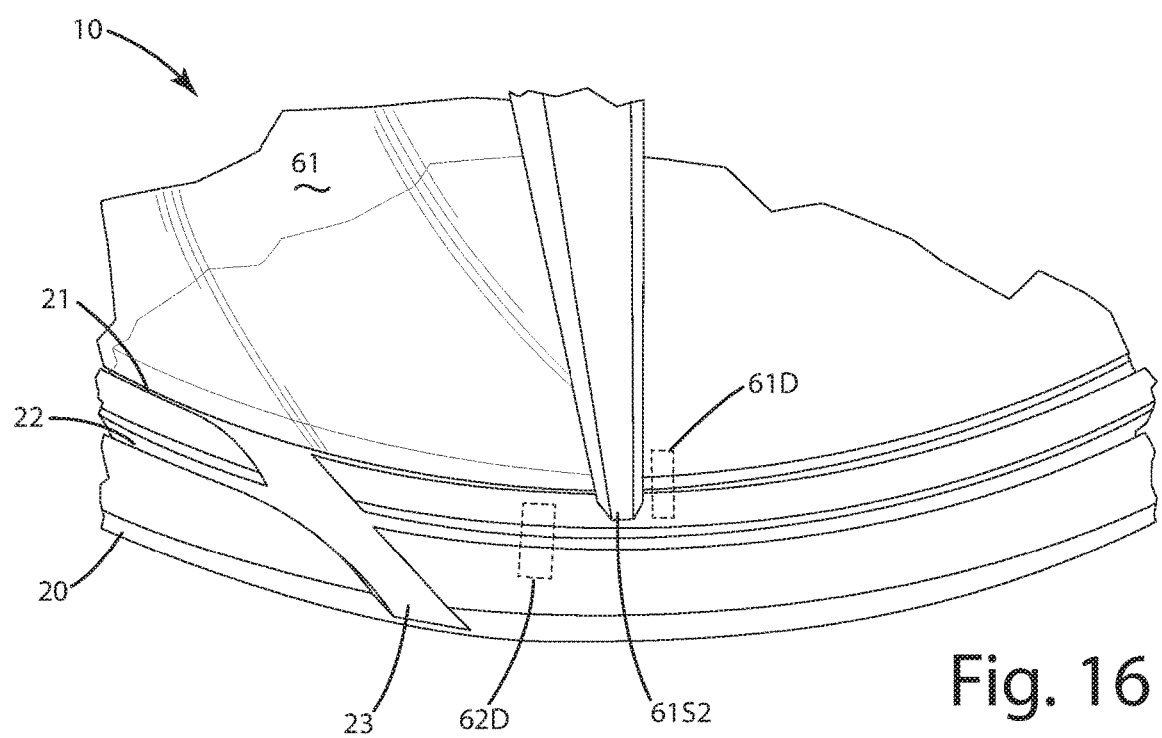
FIG. 16 is a perspective view of an introducer channel within which arcuate sheets can be installed relative to a bottom channel.
Figure 17:
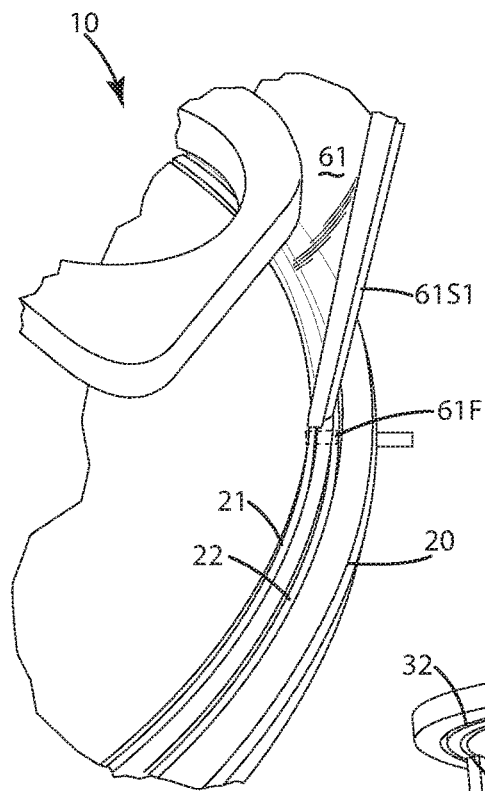
FIG. 17 is a perspective view of a stop in the base channel in relation to an arcuate panel.

Optionally, the first panel 61 can be rotationally constrained in the respective top and base channels. For example, as shown in FIGS. 16 and 17, a first dowel 61D can be disposed in the base 20, and can project into the first base channel 21, thereby forming a stop against which the side edge 61S2 is disposed. A second dowel 61F can be placed in the first base channel 21 at another location, thereby forming a second stop against which the side edge 61S2 is disposed. These respective stops can effectively form the size of the opening 99O. The stops also can prevent the first panel 61 from rotating and are moving when the second arcuate panel 62 is opened and/or closed or otherwise moved in its respective second top and base channels.

Figure 23:
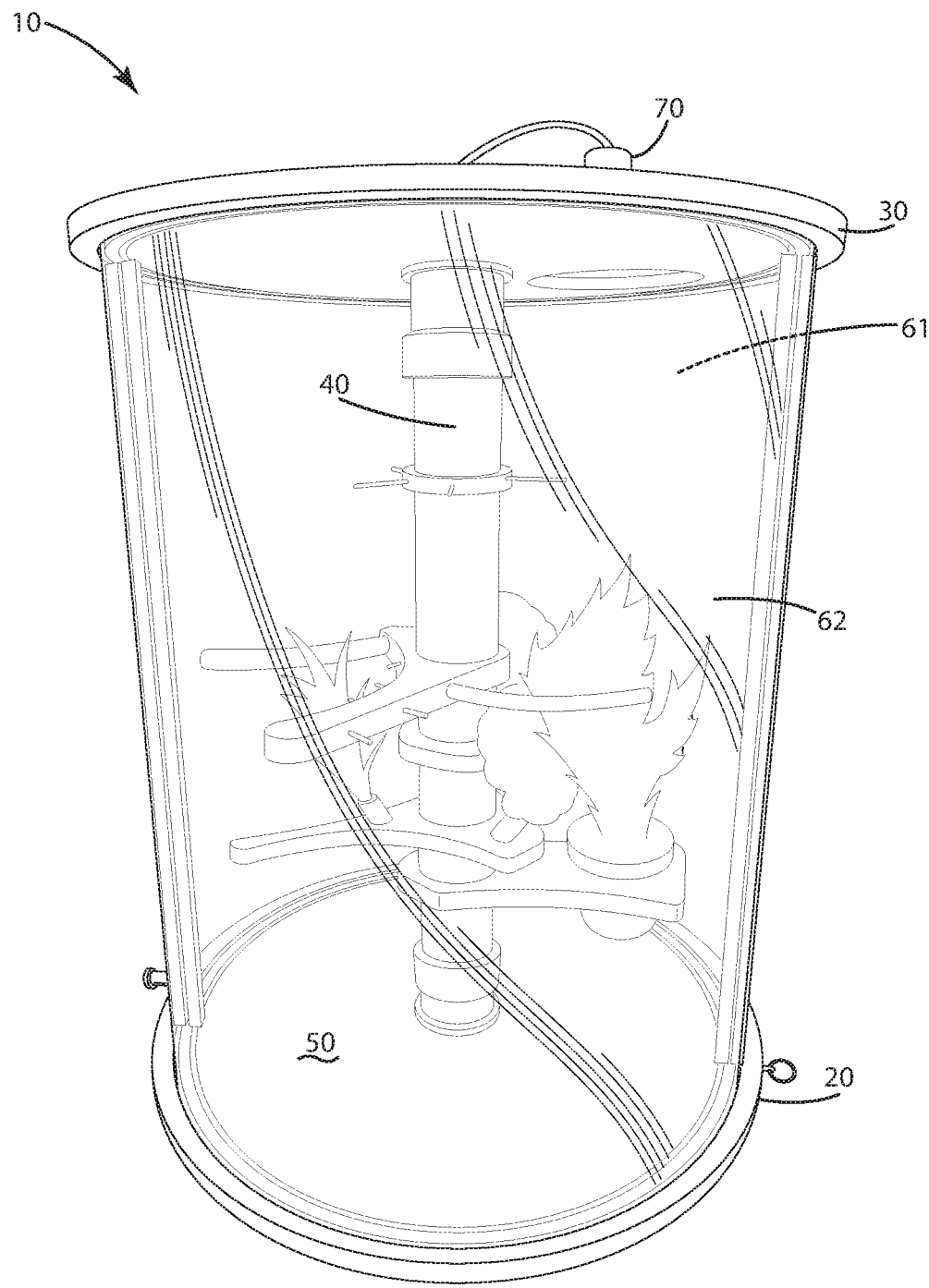
FIG. 23 is a front view of the terrarium in the closed mode.
Figure 24:
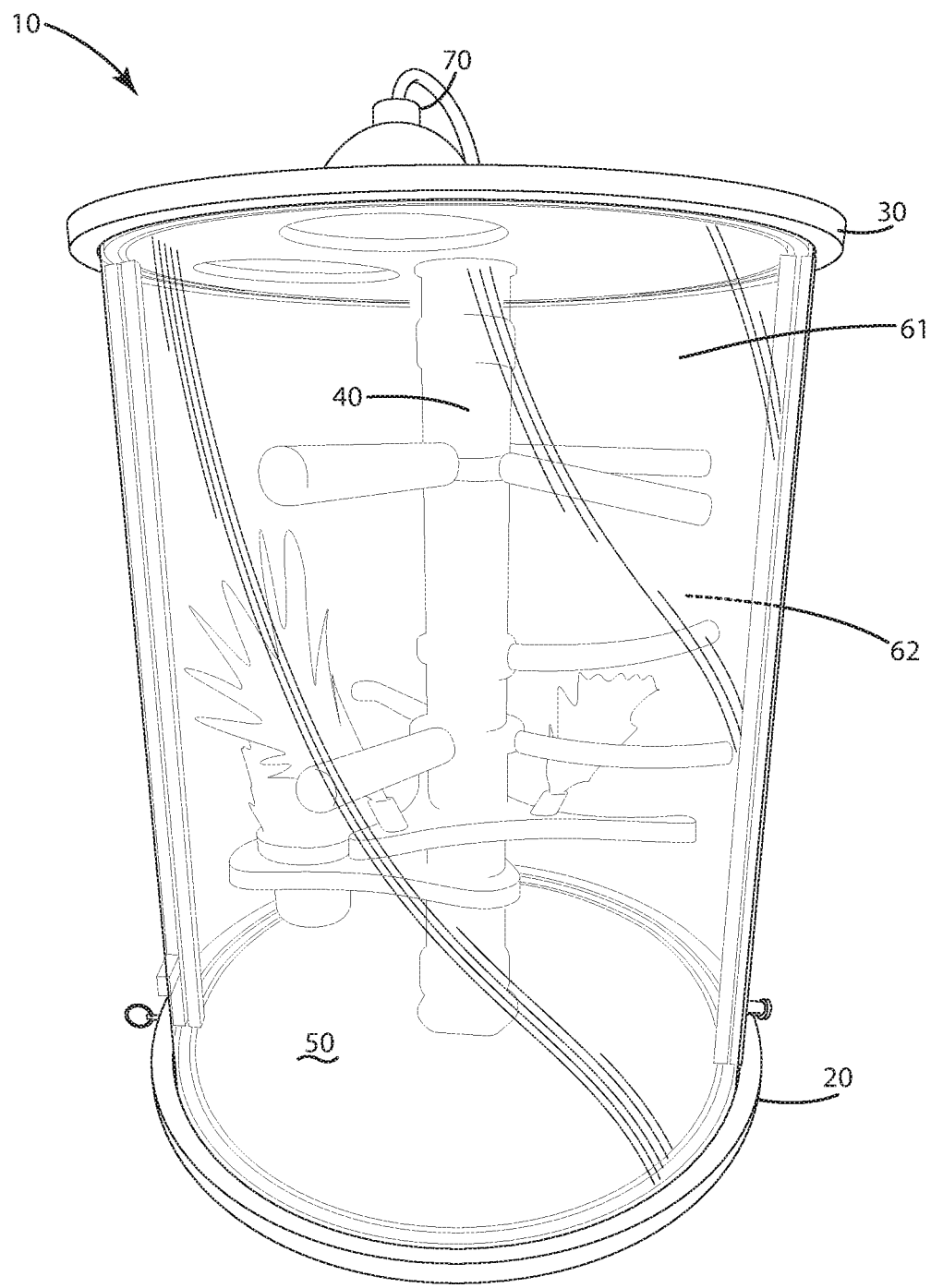
FIG. 24 is a rear view of the terrarium in the closed mode.
Figure 25:
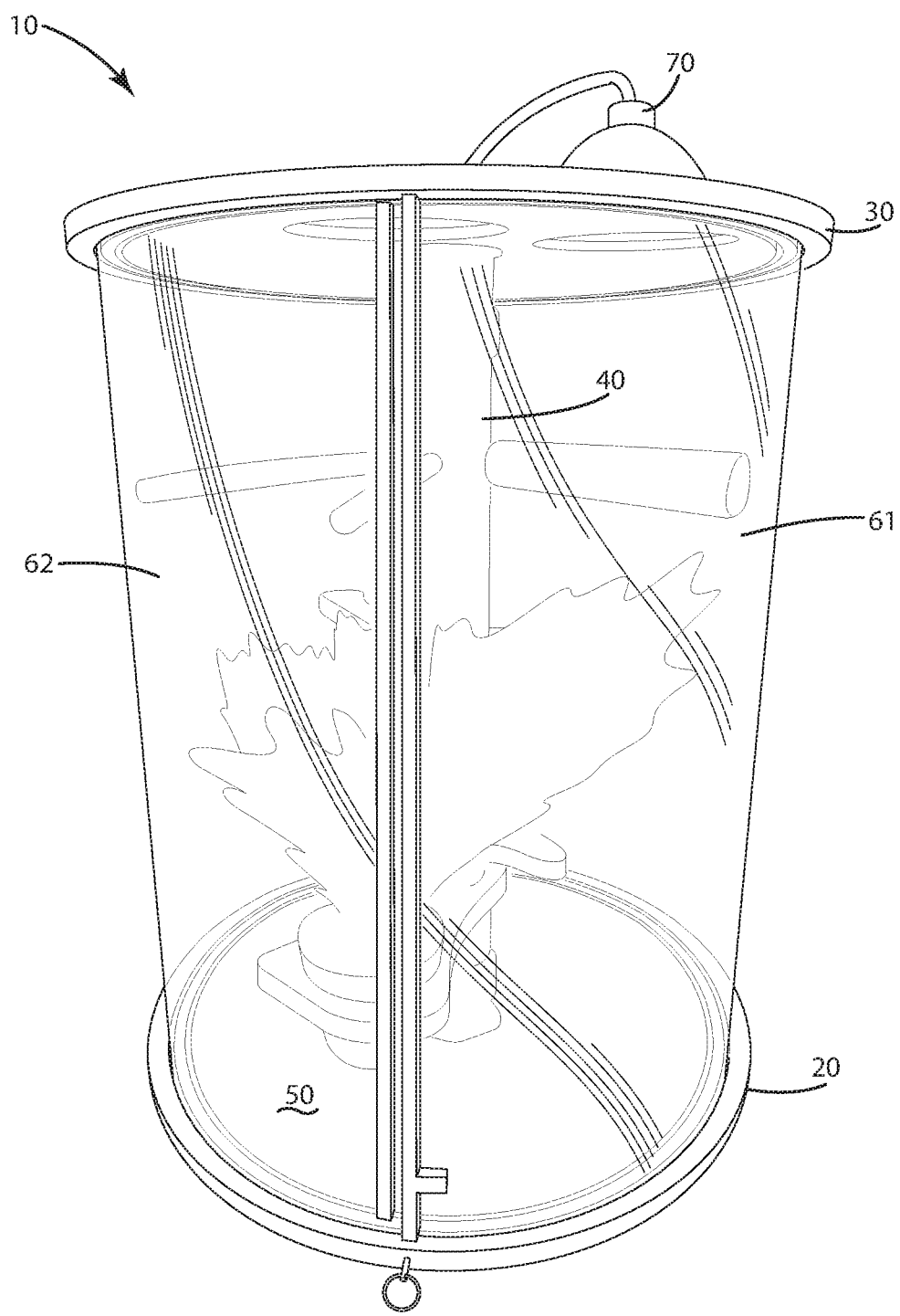
FIG. 25 is a left side view of the terrarium in a closed mode, the right side being a mirror image thereof.

As shown in FIGS. 2 and 23, the second panel 62 also can be an arcuate panel. It can be constructed from materials similar to those described above, and can be formed in the arcuate shape in a manner similar to that described in connection with the first panel. The second panel 62 can include an upper edge 62U, a lower edge 62L, and first and second side edges 62S1 and 62S2. The distance between the first side edge 62S1 and the second side edge 62S2 can be greater than or less than the distance between the respective side edges 61S1 and 61S2 of the first arcuate panel. Optionally, one or more additional arcuate panels can be added to those as illustrated.

As with the first panel above, the respective side edges 62S1 and 62S2 can be outfitted with channels to protect the edges. These channels can be outfitted with a handle 62H (FIG. 19) the can assist in opening and closing or otherwise moving the second arcuate panel 62. The second arcuate panel is disposed in the respective top and base channels and is slidable at the front of the terrarium 10.

Figure 22:
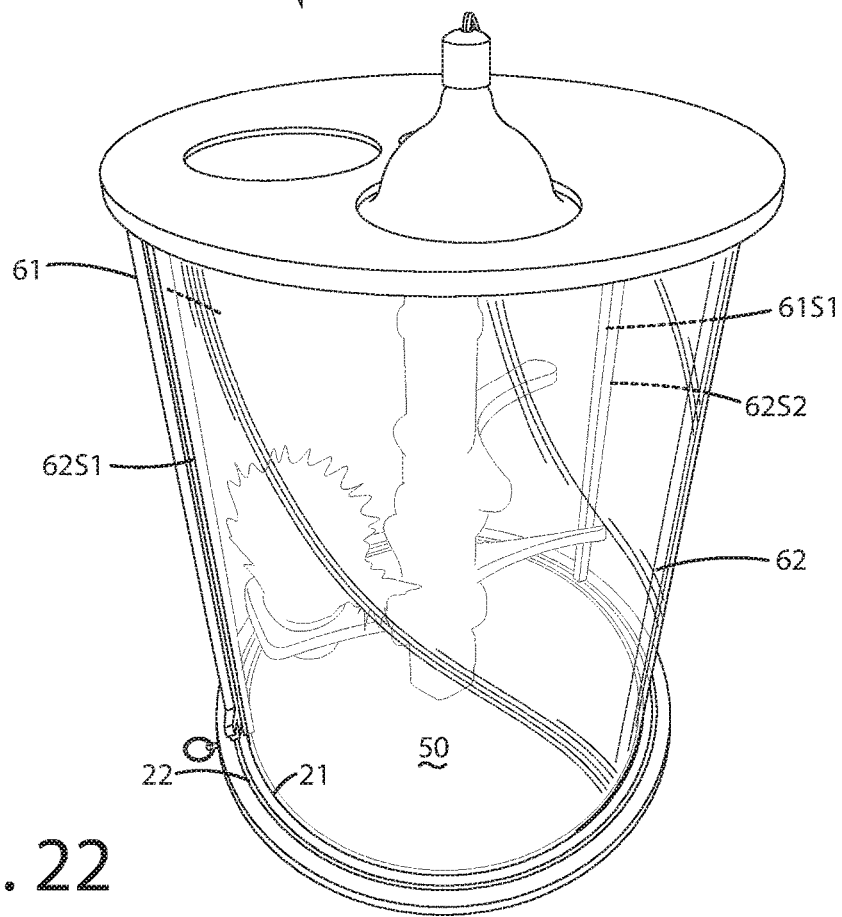
FIG. 22 is a top rear perspective view of the terrarium in a closed mode.

When fully installed, as shown in FIGS. 2, 23, and 22 the second arcuate panel 62 spans between the edges 61S1 and 61S2 so as to substantially close the opening 99O, and thus provide a complete enclosure of the internal compartment 50. Optionally, a stop or dowel 62D, shown in FIGS. 16 and 20, can be installed in the second base channel 22 so as to form a stop against which the side edge 62S1 of the second arcuate panel 62 can stop, to thereby provide adequate closure of the opening 99O. Further optionally, to lock the terrarium in a closed configuration so animals therein cannot escape through the opening 99O, the second arcuate panel 62 can be pushed against the stop 62D, which engages a first side edge of that panel. In addition, a key or secondary removable pin 62F can be installed in the base 20 and project into the second base channel 22. This in turn, forms another stop against which the second arcuate panel 62 abuts. In this manner, the second arcuate panel 62 is held in a fixed or locked configuration relative to the first arcuate panel, as well as the base.

Optionally, although not shown, the second arcuate panel 62 can be of a fixed arcuate shape. Rather than starting out as a flat planar sheet, it can be molded or formed into an arcuate panel. This arcuate panel can be movably joined with the terrarium, for example, directly to the side edge of the first panel 61. This connection can be in the form of a hinge so that the second arcuate panel 62 can swing outward, thereby providing access to the opening 99O. Further optionally, the arcuate panels herein can be comprised of multiple narrow flat panels that are hinged together so that they can be installed in the respective top and base channels.

A method of using the terrarium 10 will now be described with reference to FIGS. 1-23. It will be appreciated that when the terrarium is used in conjunction with panels that are in initially in a flat, planar configuration, the entire terrarium and its components can be shipped in a relatively flat configuration. Depending on the size of the terrarium, the overall height of packaging for the terrarium, when shipped flat, can be optionally less than 1 foot, further optionally less than 6 inches, and even further optionally less than 4 inches in height. The length and width, of course can vary depending on the sizes of the base, top and the panels, as well as the length of the support column. With the capability to flat ship the terrarium, associated shipping and handling fees can be significantly reduced. Further, because the overall dimensions of the terrarium in the shipped state are significantly less than the overall dimensions of the terrarium in the fully assembled state, the terrarium can be stocked in inventory without taking up significant retail floor space.

Turning now to FIGS. 3-11, the method of using the terrarium can begin with the placing of a base 20 on a support surface SS. A support column 40 can be installed relative to the base by screwing the lower end 41 into the opening 25 of the base 20. With the support column installed, and optional locking pin (not shown) can be projected through the support column and a portion of the base so that the support column will not rotate relative to the base. A variety of optional spacers, support rings and ventilation units can be slid in direction S downward over the support column 40. The various support rings and their supported accessories can be oriented relative to the support column 40 in a manner desired by the user. When a sufficient number of spacers, support rings and ventilation units are stacked on the support column as shown in FIG. 10, the top 30 can be threaded onto the upper end 42 of the support column as shown in FIG. 11. The top also can be rotationally locked relative to the support column with a locking pin 35L. If desired, as shown in FIG. 12, a barrier wall 23B can be installed adjacent the respective base channels 21 and 22.

Where the terrarium 10 includes a light 70, that light can be installed in the top 30, and in particular within an opening 36 to project downward from the top. Any respective electrical cords 72 can be snaked through the interior bore 43 of the support column 40 and plugged into the appropriate power source. Any other electrical devices also can be installed at this point, and/or while the spacers and support rings being installed on the support column. With the top 30 installed on the support column 40, that support column substantially entirely supports the top at the preselected distance D1 from the base 20. Optionally, no other structure is used support the top in this configuration.

Figure 15:
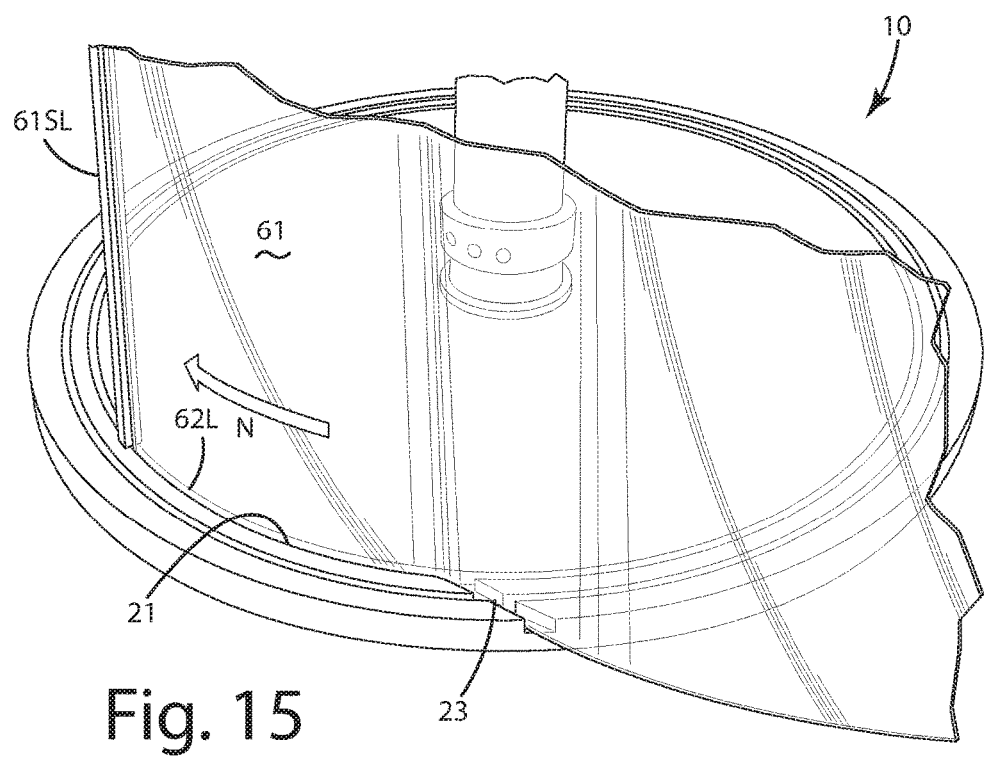
FIG. 15 is a perspective view of the flat, planar sheet being moved in a channel of the base so as to bend the flat planar sheet into a first arcuate panel.

With the top, base and support column constructed, the first and second panels 61 and 62 can be installed. As shown in FIG. 14, the first panel 61 is provided in a flat, planar sheet configuration and is in the form of a transparent polymeric material. The first side edge 61S1 is inserted into the introducer channel 23, as shown in FIG. 15. That flat planar sheet 61 is moved into the first base channel 21 and the first top channel 31. As the sheet moves further into the channel, it begins to take on the curvature and art of those respective channels. In turn, the sheet 61 begins to bend and/or flex so as to take on an arcuate shape, thereby forming the arcuate panel 61. The first panel is continued to be moved until it is fully installed in the first base channel and first top channel. The respective dowels can be placed to secure the respective edges in desired locations. The side edges also form the opening 99O of the terrarium upon completion of installation of the first panel in the first top and first base channels.

The second panel 62 can be installed in a similar manner to that as the first channel 61. Again, the second channel can start out as a flat, planar sheet of material. It can be introduced into the second top and base channels 22 and 32 via the introducer channel 23. It can bend and flex as it moves there through. Eventually, the second arcuate panel can be placed over the opening 99O between the respective edges of the first arcuate panel 61. In so doing, it effectively forms a closure over that opening. Respective dowels and locking pins can be placed to secure the second arcuate flannel if desired.

After the terrarium 10 is assembled, the user can prepare it for occupation by animals. Artificial foliage, watering receptacles, and other accessories can be placed within the internal compartment 50 for use by the animals. Of course, optionally, the foregoing items can be installed before the panels if desired.

Figure 31:
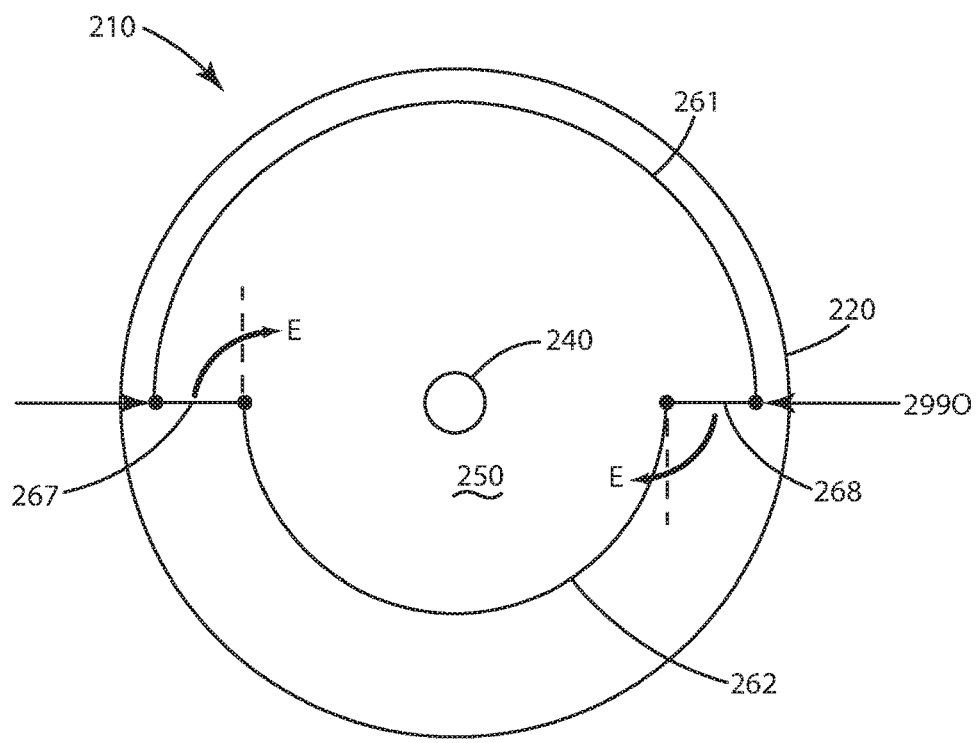
FIG. 31 is a top plan view of a second alternative embodiment, illustrating hinged panel doors for access to the internal compartment of the terrarium.

A second alternative embodiment of the terrarium is illustrated in FIG. 31 and generally designated 210. This embodiment can be similar in structure, function and operation to the embodiments described herein. For example, the terrarium 210 can include a base 220 and a top (not shown) supported by the support column 240, as well as the first 261 and second 262 arcuate panels, which are disposed in respective top and base channels, although not shown. The first arcuate panel 261 can also form an opening to 299O that spans across the base 220. This opening 299O can be closed by a closure which is effectively formed by second arcuate panel 262, as well as additional panels 267 and 268. The first and second arcuate panels can be fixedly disposed in their respective top and base channels. Indeed, the second arcuate panel 262 can be relatively immovable after installation relative to the first panel and or the base 220.

Optionally, the additional panels 267 and 268 can be hingedly, foldably, slidably, or otherwise attached to the first and/or second arcuate panels, or some other support structure between the top and the base 220. The panels 267 and 268 can be constructed from materials similar to those from which the first and second arcuate panels are constructed. The panels optionally can be transparent, translucent and/or opaque. The panels can be perforated or vented to allow air to flow there through. The panels 267 and 268 can hinge, pivot and/or move inward or outward as shown in the direction of the arrows E. In this manner, the additional panels 267 and 268 provide access to the internal compartment 250 of the terrarium 210. Optionally, these additional panels can be of any number, and can be attached to the terrarium to form virtually any type of closure relative to the internal compartment 250.

Figure 32:
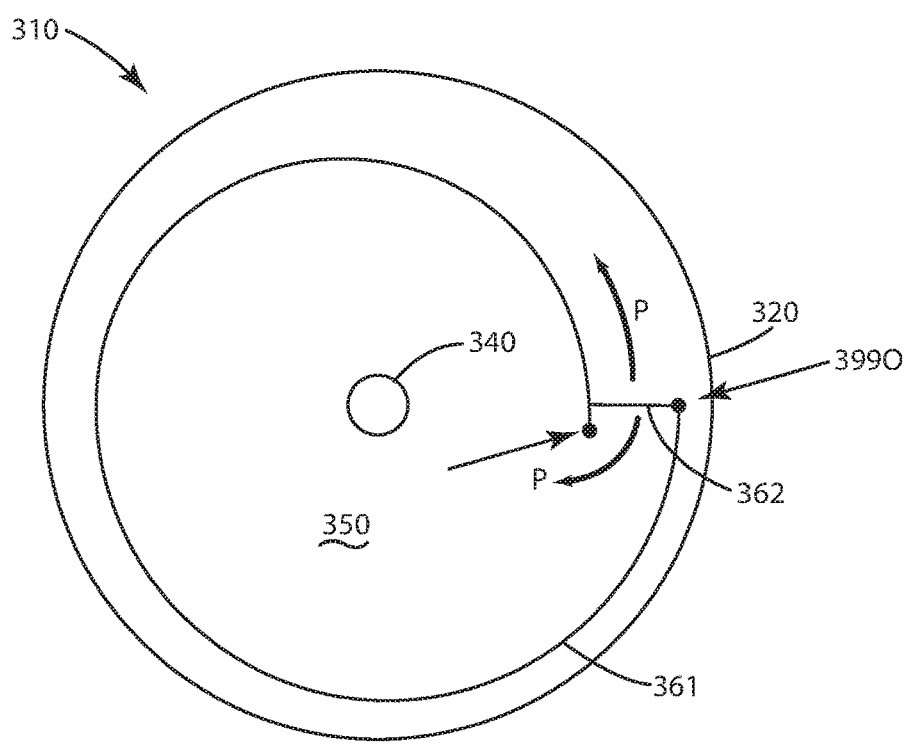
FIG. 32 is a top plan view of a third alternative embodiment, illustrating a single arcuate panel and a hinged panel for access to the internal compartment of the terrarium.

A third alternative embodiment of the terrarium is illustrated in FIG. 32 and generally designated 310. This embodiment can be similar in structure, function and operation to the embodiments described herein. For example, the terrarium 310 can include a base 320 and a top (not shown) supported by the support column 340, as well as a first 361 arcuate panel, which is disposed in and can be fixed and immovable relative to the respective top and base channels, although not shown. The first arcuate panel 361 optionally can be the only arcuate panel used in this construction. The first arcuate panel 361 can also form an opening to 399O that spans across a minor side of the base 320, generally only on one side of the support column 340. This opening 399O can be closed by a closure which is effectively formed by a single additional panel 362. This additional panel 362 can be hingedly, foldably, slidably or otherwise attached to the first arcuate panel 361, or some other support structure between the top and the base 320. The panel 362 can be constructed from materials similar to those from which the first arcuate panel is constructed. The panel optionally can be transparent, translucent and/or opaque, and can be perforated or vented to allow air to flow there through. The second panel 362 can hinge, pivot and/or move inward or outward as shown in the direction of the arrows P. In this manner, the second panel 362 provides access to the internal compartment 350 of the terrarium 310. Optionally, the additional panel can be of any number, and can be attached to the terrarium to form virtually any type of closure relative to the internal compartment 350.

Figure 33:
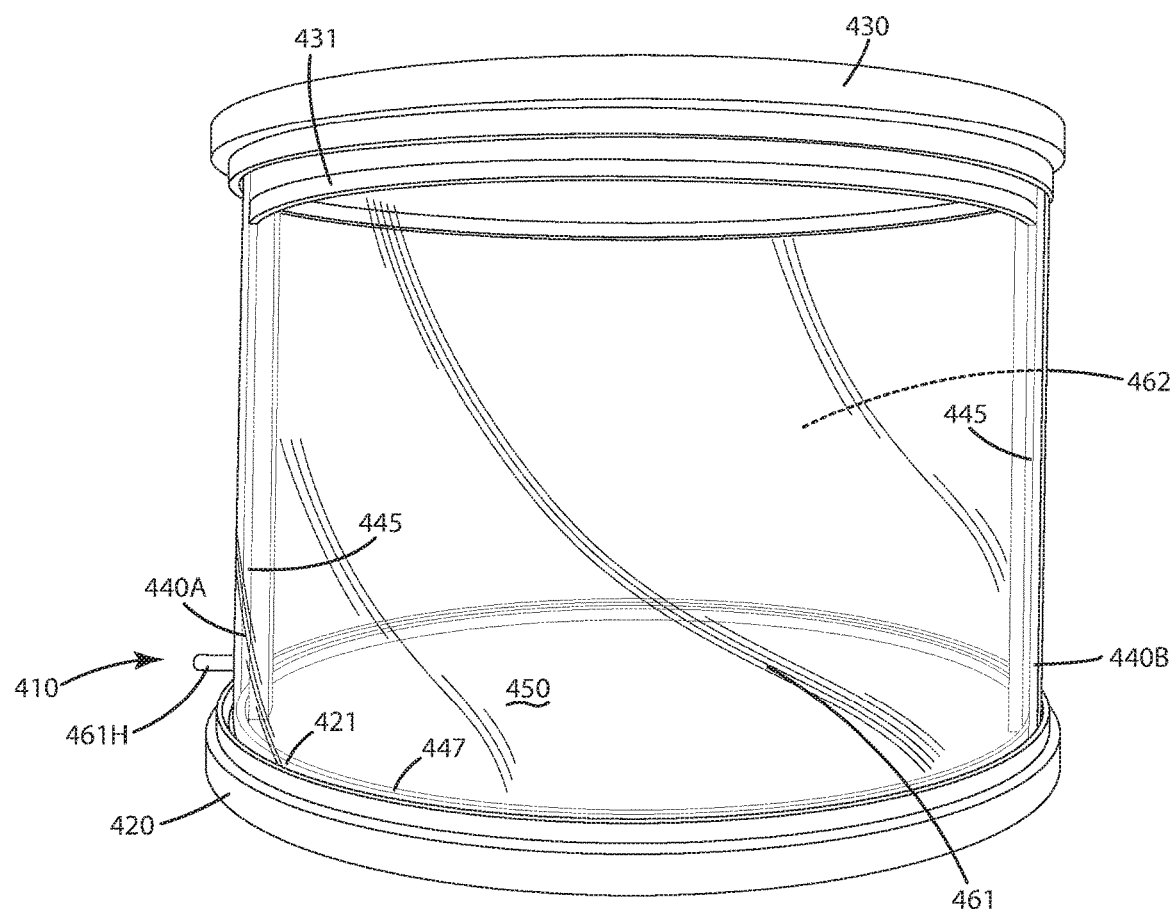
FIG. 33 is a front view of a fourth alternative embodiment including multiple, non-central support columns.
Figure 34:
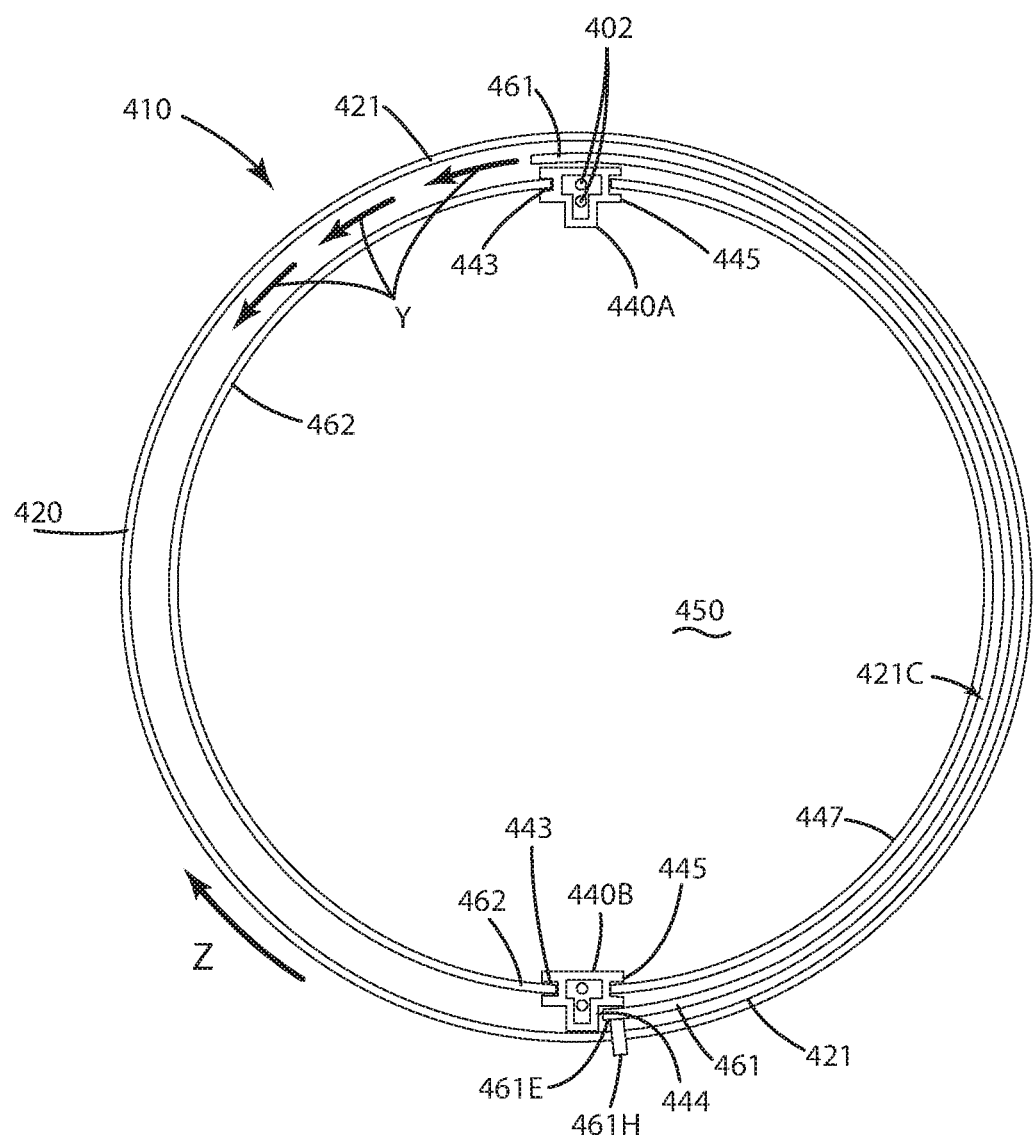
FIG. 34 is a top plan view of the support columns and associated arcuate panel.

A fourth alternative embodiment of the terrarium is illustrated in FIGS. 33-34 and generally designated 410. This embodiment can be similar in structure, function and operation to the embodiments described herein. For example, the terrarium 410 can include a base 420 and a top 430, as well as a first 461 arcuate panel, which is slidable in respective top 431 and base 421 tracks associated with the top and base. The arcuate panel 461 can be transparent. The terrarium also can include a second arcuate panel 462. This arcuate panel can be generally fixed between the supports 440A and 440B. Optionally, the panel 462 can be at least partially opaque and in the form of a metal mesh if desired.

The terrarium can include first and second support columns 440A and 440B. As shown, these support columns can extend between the top and the base and can fully support the top, rather than the arcuate panel supporting the top. Indeed, the arcuate panels 461, 462 can be gapped at their upper edges like the embodiments above. The support columns can further be in the form of hollow tubes so that electrical wires, conduits and/or plumbing 402 can extend upward and through the supports to the internal compartment 450 and/or the top 430.

Generally, as shown in FIG. 34 each of the support columns can extend at least partially within the internal compartment 450. One or both of the support columns 440A and 440B can be located inward relative to the first arcuate panel 461, as well as the outer base track 421 and top track 431, which both simply can be formed from short 1"-3" tall walls outside the arcuate panel to hold the panel inward relative to it. These elements still, however, form respective top and base channels relative to the top and base. One or both of the support columns can be of a "T" configuration having a capture portion 443 and a stop portion 444. The capture portion 443 can capture ends of the second arcuate panel 462, holding it in a fixed configuration relative to the supports. Another capture portion 445, opposite the portion 443 or the support, can capture an end of an optional short base wall 447 adjacent the base. As shown, the base wall 447 and base track 421 cooperatively form a channel 421C relative to the base. Although not shown, a similar channel can be formed adjacent the top 430. The base 440B can include a stop portion 444 that is placed immediately adjacent the track 421, and can form a limiting stop to arrest movement of the arcuate panel 461 in the track 421 when the panel is closed as shown in FIG. 34. This can be helpful when the arcuate panel 461 is closed with a handle 461H by engaging the handle and/or the panel 461 against the stop portion 444.

The other support column 440A can be disposed inwardly from the track 421 so that no part of the support column 440A stops movement of the arcuate panel 461, and thus the arcuate panel can slide past the support column 440A in a direction Y, generally following the track 421 outside it, to form an opening between the support columns 440A and 440B where the arcuate panel once was located. This opening can be used access the internal compartment 450. After access is no longer needed, the arcuate panel 461 can be closed in direction Z until an end 461E engages the stop 444, thereby closing off the internal compartment 450.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A terrarium comprising:
   a base including a first base channel and a second base channel;
   a support column including an upper end and a lower end, the column extending upwardly from the base, the lower end secured to the base;
   a top including a first top channel and a second top channel, the top being supported entirely by the support column at a first preselected distance from the base;
   a first arcuate panel extending between the top and the base, the first arcuate panel being disposed in the first top channel and the first base channel, the first arcuate panel forming an opening between the top and the base;
   a second arcuate panel extending between the top and the base, the second arcuate panel being disposed in the second top channel and the second base channel, the second arcuate panel forming a closure of the opening,
   wherein at least one of the first and second arcuate panels is a transparent panel,
   wherein the first and second arcuate panels cooperate with the top and the base to define an internal compartment,
   wherein the support column extends within the internal compartment,
   wherein the closure is selectively slidable within the second top channel and the second base channel to provide access to the internal compartment between the top and the base.

2. The terrarium of claim 1,
   wherein the first and second arcuate panels are each separated from the top so as to define a gap between the top and each of the first and second arcuate panels,
   wherein the first and second arcuate panels do not support the top.

3. The terrarium of claim 1,
   wherein the support column defines an interior bore extending within the column from the upper end toward the lower end,
   wherein the interior bore forms a chimney extending from the lower end toward the upper end;
   wherein the support column defines a first air vent in fluid communication with the chimney and the internal compartment,
   whereby the chimney promotes air circulation in the internal compartment.

4. The terrarium of claim 3,
   wherein the first air vent is defined in the lower end of the support column;

wherein a second air vent is disposed in the upper end of the support column.

5. The terrarium of claim 1,
wherein the support column defines an interior bore extending within the column from the upper end toward the lower end,
wherein at least one of an electrical cord and a conduit extend upward within the interior bore toward the top,
wherein the top includes a light that projects radiation into the internal compartment,
wherein the electrical cord is joined with the light.

6. The terrarium of claim 3, comprising a support ring joined with the column,
wherein the support ring is joined with at least one of a watering receptacle, a platform and a perch,
wherein the at least one of a watering receptacle, a platform and a perch extend radially outward from a longitudinal axis of the column,
wherein the support ring engages the column and supports the at least one of a watering receptacle, a platform and a perch at a second preselected distance from the base,
whereby a user can adjust the location of the support ring relative to the column and thereby adjust the second preselected distance.

7. The terrarium of claim 1,
wherein the first and second arcuate panels are constructed from a flexible, transparent polymeric material,
wherein the first and second arcuate panels are bent from a flat, planar shape to an arcuate shape to fit into the respective first top channel, first bottom channel, second top channel and second bottom channel,
wherein interfitment of the first and second arcuate panels in the respective first top channel, first bottom channel, second top channel and second bottom channel, forcibly maintains the arcuate shape, with each of the first and second arcuate panels are urged outward to engage outside walls of each of the respective first top channel, first bottom channel, second top channel and second bottom channel, but not interior walls of the respective first top channel, first bottom channel, second top channel and second bottom channel, due to the first and second arcuate panels attempting to regain their respective previous flat, planar shape.

8. The terrarium of claim 1,
wherein each of the first and second arcuate panels are urged outward to engage outside walls of each of the respective first top channel, first bottom channel, second top channel and second bottom channel, but not interior walls of the respective first top channel, first bottom channel, second top channel and second bottom channel, due to the first and second arcuate panels attempting to regain their respective previous flat, planar shape.

9. The terrarium of claim 1,
wherein the first base channel and second base channel are each in the form of upward facing U-shaped tracks that extend along a portion of the base.

10. A terrarium comprising:
a base including a generally arcuate base channel;
a support column including an upper end and a lower end, the support column extending upwardly from the base, the lower end joined with the base;
a top including a generally arcuate top channel, the top being supported and engaged by the support column at a preselected distance from the base, the top channel including a channel bottom wall and a channel outside wall; and
a first arcuate panel having a first panel upper edge and an opposing first panel lower edge, a first panel first side edge and an opposing first panel second side edge, the first panel upper edge being disposed in the top channel, the first panel lower edge being disposed in the base channel, the first panel side edge and the opposing first panel side edge being spaced from one another so as to form an opening;
wherein the first arcuate panel is a transparent panel,
wherein the first arcuate panel cooperates with the top and the base to define at least a portion of an internal compartment,
wherein the support column extends within at least a portion of the internal compartment,
wherein the first panel upper edge is spaced a first gap within the top channel from the channel bottom wall so that the first arcuate panel does not support any substantial weight of the top.

11. The terrarium of claim 10 comprising:
a second arcuate panel having a second panel upper edge and an opposing second panel lower edge, a second panel first side edge and an opposing second panel second side edge, the second panel arcuate panel being located between the first panel first side edge and the first panel second side edge so as to form a closure over the opening,
wherein the closure is selectively displaceable relative to the opening so that a user can access the internal compartment between the top and the base.

12. The terrarium of claim 11,
wherein the second arcuate panel is slidable relative to the base and the top so that the second arcuate panel can be slidably displaced about a longitudinal axis to access the opening,
wherein the opening is disposed below the top and above the base.

13. The terrarium of claim 10,
wherein the support column defines an interior bore extending within the column from the upper end toward the lower end,
wherein the interior bore forms a chimney extending from the lower end to the upper end;
wherein the support column defines a first air vent in fluid communication with the chimney and the internal compartment,
whereby the chimney promotes air circulation in the internal compartment.

14. The terrarium of claim 10,
wherein the first arcuate panel upper edge exerts an outward force so as to be urged against outside wall due to the first arcuate panel being previously configured as a flat planar sheet before installation in the top channel.

15. The terrarium of claim 10 comprising a closure selectively displaceable relative to the opening so that a user can access the internal compartment between the top and the base.

16. The terrarium of claim 15 comprising:
a support including a support ring disposed around the column, the support ring not extending into the interior bore,
wherein the support is joined with at least one of a watering receptacle, a platform and a perch, wherein the at least one of a watering receptacle, a platform and a perch extend radially outward from a longitudinal axis of the column, wherein the support ring engages the column and supports the at least one of a watering receptacle, a platform and a perch at a second preselected distance from the base, whereby a user can adjust the location of the support ring relative to the column and thereby adjust the second preselected distance.

17. The terrarium of claim 16 comprising a spacer, the spacer disposed around the column, the spacer not extending into the interior bore, wherein the spacer is disposed under the support ring, wherein the support ring rests atop the spacer so that the at least one of a watering receptacle, a platform and a perch is disposed at the second preselected distance from the base.

18. The terrarium of claim 15, wherein the closure is in the form of a door selectively disposed over the opening.

19. The terrarium of claim 10:

wherein the support column is a first support column, wherein a second support column extends within at least a portion of the internal compartment distal from the first support column, wherein the second support column supports and engages the top along with the first support column.

20. The terrarium of claim 19 comprising:

a closure panel forming a closure over the opening, wherein the closure is selectively displaceable relative to the opening so that a user can access the internal compartment between the top and the base.

* * * * *